United States Patent
Kato

(10) Patent No.: US 7,880,923 B2
(45) Date of Patent: Feb. 1, 2011

(54) IMAGE FORMING APPARATUS PRINT PROCESSING METHOD AND CHARGING CONTROL SYSTEM

(75) Inventor: Kazunori Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 11/829,318

(22) Filed: Jul. 27, 2007

(65) Prior Publication Data

US 2008/0030750 A1    Feb. 7, 2008

(30) Foreign Application Priority Data

Aug. 7, 2006    (JP)    ............... 2006-214529

(51) Int. Cl.
*G06F 15/00*    (2006.01)

(52) U.S. Cl. ............... 358/1.4; 358/1.15; 358/1.14; 358/1.13; 377/13; 705/33; 705/34; 709/203

(58) Field of Classification Search ............... 358/1.14, 358/1.15, 1.9; 399/6, 8; 709/200; 705/38
See application file for complete search history.

(56) References Cited

U.S. PATENT DOCUMENTS

| | | | | |
|---|---|---|---|---|
| 6,404,994 | B1* | 6/2002 | Kawai et al. ............... | 399/6 |
| 2003/0233476 | A1* | 12/2003 | Henry ............... | 709/245 |
| 2004/0085583 | A1 | 5/2004 | Yamamura | |
| 2004/0267868 | A1* | 12/2004 | Wilk ............... | 709/200 |
| 2005/0275868 | A1* | 12/2005 | Higashiura et al. ......... | 358/1.14 |
| 2006/0293966 | A1* | 12/2006 | Inouye ............... | 705/26 |
| 2007/0182984 | A1* | 8/2007 | Ragnet et al. ............... | 358/1.15 |

FOREIGN PATENT DOCUMENTS

| | | |
|---|---|---|
| JP | 2003-216395 A | 7/2003 |
| JP | 2004-152139 A | 5/2004 |
| JP | 2005-024817 A | 1/2005 |
| JP | 2005-141311 A | 6/2005 |

* cited by examiner

*Primary Examiner*—King Y Poon
*Assistant Examiner*—David S Cammack
(74) *Attorney, Agent, or Firm*—Canon U.S.A., Inc., IP Division

(57) ABSTRACT

At least one exemplary embodiment is directed to an image forming apparatus configured to perform printing when a reservation request including a count value for the printing is accepted by a management apparatus that performs charging management according to a print result, the image forming apparatus including: a transmission unit configured to transmit, to the management apparatus, a reservation request including a count value for printing a part of a print job before completing analysis on the entire print job; and a printing unit configured to perform printing according to an acceptance of the reservation request by the management apparatus.

11 Claims, 29 Drawing Sheets

FIG.7

| USER NAME (501) | PASSWORD (502) | |
|---|---|---|
| User1 | 123 | ~511 |
| User2 | 345 | ~512 |
| User3 | *** | ~513 |

FIG.8

| JOB ID (701) | USER NAME (702) | RESERVATION FEE (703) | |
|---|---|---|---|
| 01 | User1 | 120 | ~711 |
| 02 | User2 | 300 | ~712 |
| 03 | User2 | 210 | ~713 |

FIG.9

| USER NAME | REMAINING DEPOSIT | RESERVATION SUM | |
|---|---|---|---|
| User1 | 500 | 120 | ~611 |
| User2 | 1000 | 510 | ~612 |
| User3 | 2000 | 0 | ~613 |

| JOB ID *1001* | OWNER NAME *1002* | DEPOSIT LIMIT *1003* | EXPENDITURE SUM *1004* | RASTERIZED PAGE FEE *1005* | NUMBER OF COPIES *1006* |
|---|---|---|---|---|---|
| 01 | User1 | 120 | 100 | 170 | 1 |
| 02 | User2 | 0 | 0 | 0 | 2 |
| 03 | User3 | 0 | 0 | 0 | 1 |

FIG.11

|  | SHEET SIZE | |
| --- | --- | --- |
|  | SMALL | LARGE |
| 1111 — COLOR | 50 | 100 |
| 1112 — MONOCHROME | 10 | 20 |

FIG.17

| CHARGING DESTINATION (1651) | USER LIST (1652) |
|---|---|
| SALES DIVISION I | User1, User2 — 1661 |
| M-COMPANY PROJECT | User1 |
| SALES DIVISION II | User3 |

FIG.19

| JOB ID | USER NAME | CHARGING DESTINATION | RESERVATION FEE | |
|---|---|---|---|---|
| 01 | User1 | SALES DIVISION I | 120 | ~1711 |
| 02 | User2 | M-COMPANY PROJECT | 300 | ~1712 |
| 03 | User1 | M-COMPANY PROJECT | 210 | ~1713 |

Columns: 1701, 1702, 1703, 1704

FIG.20

| CHARGING DESTINATION | REMAINING DEPOSIT | RESERVATION SUM |
|---|---|---|
| SALES DIVISION I | 2000 | 120 |
| M-COMPANY PROJECT | 1000 | 510 |
| SALES DIVISION II | 2000 | 0 |

Columns: 1551, 1552, 1553

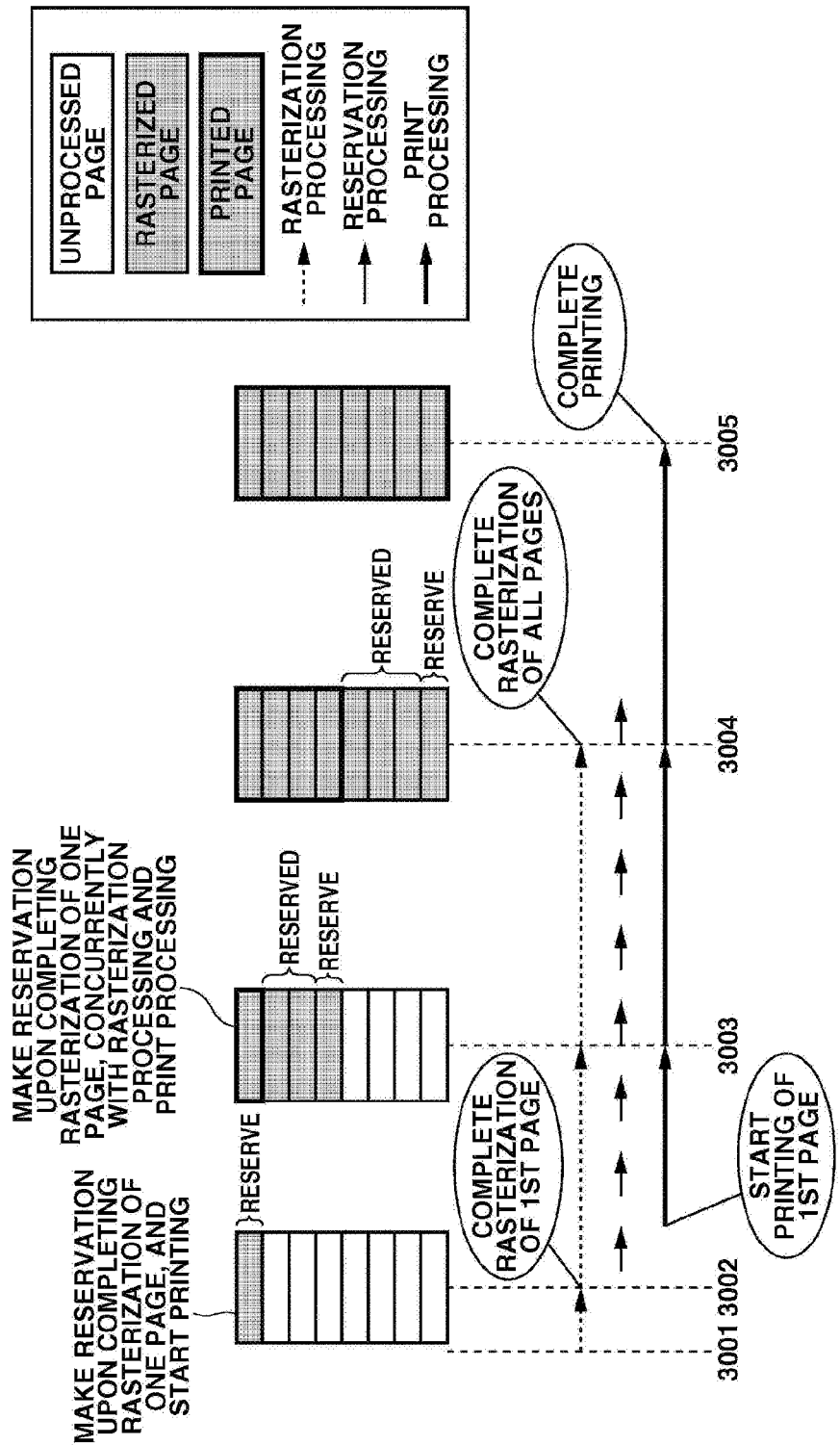

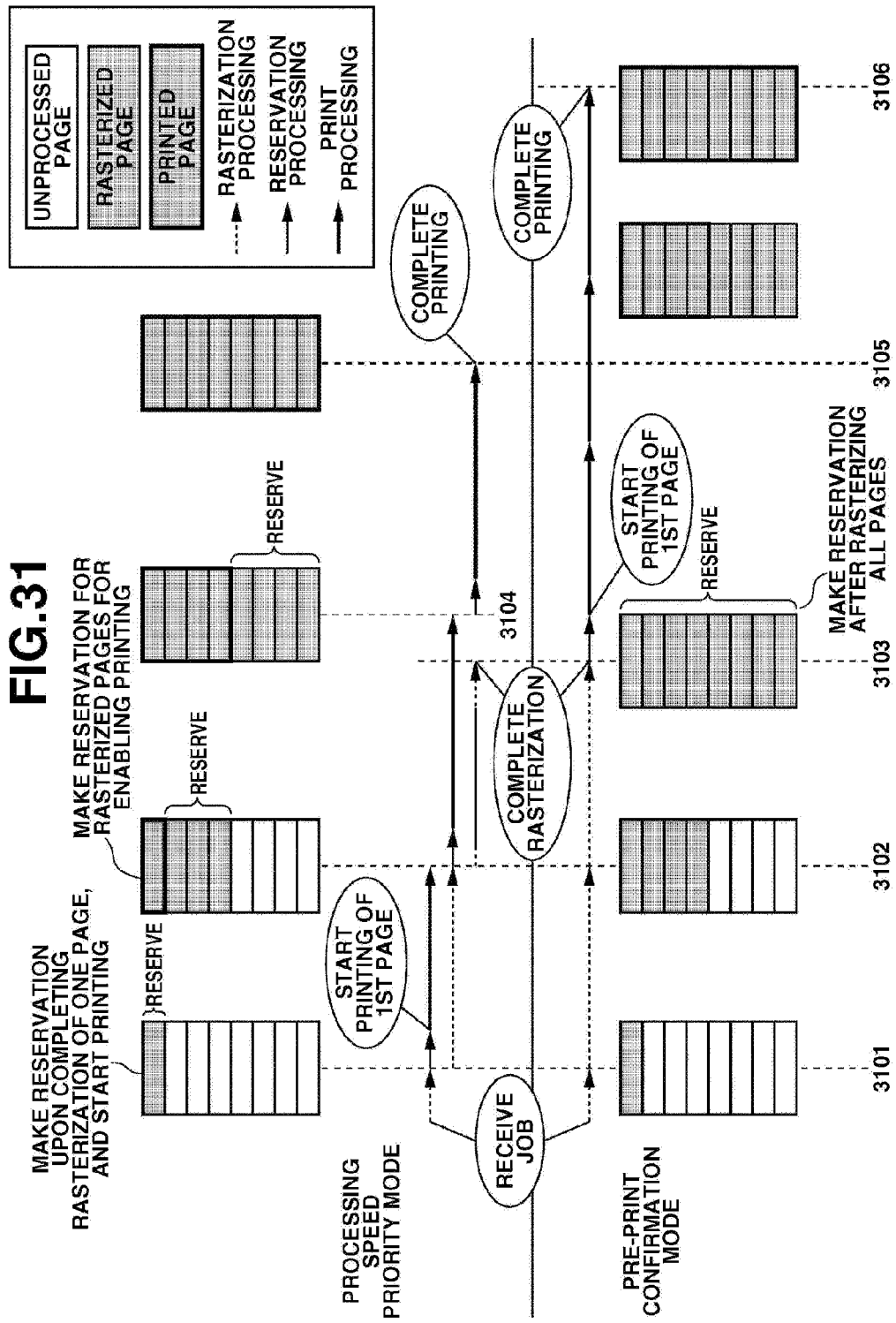

IMAGE FORMING APPARATUS PRINT PROCESSING METHOD AND CHARGING CONTROL SYSTEM

BACKGROUND OF THE INVENTION

1. Field of the Invention

The present invention relates to an image forming apparatus, a print processing method, and a charging control system, which are applicable to charging processing performed according to a result of print processing of, for example, a copying machine, a printer, or a multifunction peripheral.

2. Description of the Related Art

A coin vendor is conventionally available for performing charging management according to a print result of an image forming apparatus, such as a printer or a multifunction peripheral. The coin vendor allows a user to deposit a desired amount of money, and at timing the printer completes printing of one page, the coin vendor subtracts a fee for each page from the deposited amount of money.

As discussed in Japanese Patent Application Laid-Open No. 2003-216395, a personal computer (PC) can operate as a charging system that controls charging information and integrally manages charging fees of a plurality of multifunction peripherals.

According to a method discussed in Japanese Patent Application Laid-Open No. 2003-216395, a user previously reserves a required number of sheets as part of a job input operation in order to prevent the print processing from stopping due to an excessive amount of charge exceeding the limit.

Furthermore, as discussed in Japanese Patent Application Laid-Open No. 2004-152139, it is useful to manage the number of sheets that a user can use for printing. For example, if the print number requested by a user (i.e., the number of sheets to be used for an input job) is below an upper limit, the requested print number for the input job is reserved as a reservation count value and then the printer can start printing.

However, according to a system requiring a user to reserve a sheet number for an input print job, the printer cannot start printing until a charging control server accepts reservation of the requested sheet number for the input print job. The reservation sheet number to be charged can be obtained when the printer performs rasterization processing for the input print job.

A printer, if configured to perform printing without any charging control, can start printing during rasterization processing of a job. However, according to a system requiring a user to reserve an output sheet number of an input print job and configured to perform a charging management according to the print result, a user cannot start printing if reservation for the output sheet number is not yet completed. Accordingly, there is a long time lag before the printer actually starts printing of a first page.

SUMMARY OF THE INVENTION

Exemplary embodiments of the present invention are directed to a method for reducing the processing time for accomplishing printing of a first page when a user instructs printing, when a charging management is performed according to a print result of an image forming apparatus.

According to an aspect of the present invention, an image forming apparatus configured to perform printing when a reservation request including a count value for the printing is accepted by a management apparatus that performs charging management according to a print result, includes: a transmission unit configured to transmit, to the management apparatus, a reservation request including a count value for printing a part of a print job before completing analysis on the entire print job; and a printing unit configured to perform printing according to an acceptance of the reservation request by the management apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 7 illustrates an authentication information management table used by the authentication server that manages authentication information for each user according to the first exemplary embodiment of the present invention.

FIG. 8 illustrates a reservation management table used by a reservation managing unit of the charging control server that manages reservation information for each job according to the first exemplary embodiment of the present invention.

FIG. 9 illustrates a balance management table used by a balance managing unit of the charging control server that manages remaining deposit information for each user according to the first exemplary embodiment of the present invention.

FIG. 10 illustrates a job information management table used by a job managing unit of the copying machine that manages print job information according to the first exemplary embodiment of the present invention.

FIG. 11 illustrates a charged fee table used by the job managing unit of the copying machine that manages charged fees corresponding to print settings of print processing according to the first exemplary embodiment of the present invention.

FIG. 17 illustrates a charging destination table used by the balance managing unit of the charging control server that manages charging destination information according to a second exemplary embodiment of the present invention.

FIG. 19 illustrates a reservation management table used by the reservation managing unit of the charging control server that manages reservation information for each job according to the second exemplary embodiment of the present invention.

FIG. 20 illustrates a balance management table used by the balance managing unit of the charging control server that manages remaining deposit information for each charging destination according to the second exemplary embodiment of the present invention.

FIG. 30 is a timing chart illustrating the rasterization processing, reservation processing, and print processing performed by the copying machine according to the third exemplary embodiment of the present invention.

FIG. 31 is a timing chart illustrating the rasterization processing, reservation processing, and print processing performed by the copying machine according to the fourth exemplary embodiment of the present invention, when a "processing speed priority mode" and the "pre-print confirmation mode" can be set.

DETAILED DESCRIPTION OF THE EMBODIMENTS

Figure 1:
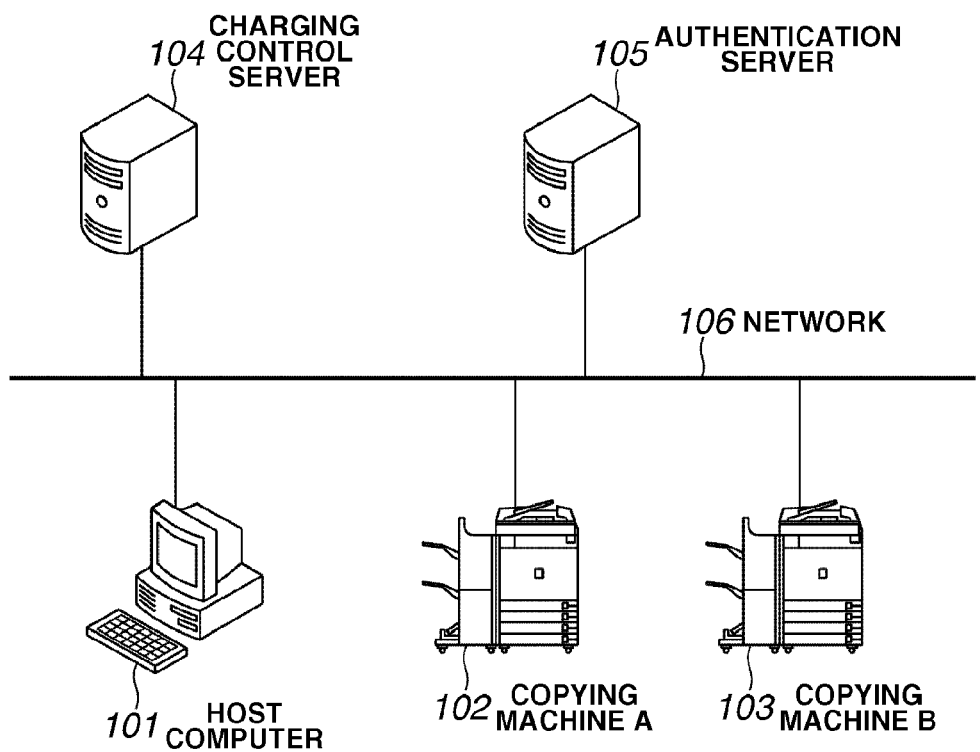
FIG. 1 illustrates a network system for performing a printing charging control according to a first exemplary embodiment of the present invention.

The following description of exemplary embodiments is illustrative in nature and is in no way intended to limit the invention, its application, or uses.

Processes, techniques, apparatus, and systems as known by one of ordinary skill in the art are intended to be part of the enabling description where appropriate.

For example, certain circuitry for image processing, data processing, and other uses may not be discussed in detail. However, these systems and the methods to fabricate these systems as known by one of ordinary skill in the relevant art are intended to be part of the enabling disclosure herein where appropriate.

It is noted that throughout the specification, similar reference numerals and letters refer to similar items in the following figures, and thus once an item is described in one figure, it may not be discussed for following figures.

Exemplary embodiments will be described in detail below with reference to the drawings.

First Exemplary Embodiment

Now, a first exemplary embodiment of the present invention will be described below. FIG. 1 illustrates a network system for performing a printing charging control according to an exemplary embodiment of the present invention.

A host computer 101 generates print data and enables a user to instruct print processing.

A copying machine A 102 and a copying machine B 103 respectively have a printer function for printing print data received via a network using a publicly known printing method (e.g., an electrophotographic printing method, an inkjet printing method, etc). Furthermore, the copying machine A 102 and the copying machine B 103 respectively have a scanner function for reading a document with a scanner, and a copy function for printing the image read by the scanner. The copying machine according to the present exemplary embodiment is not limited to the copying machines A 102 and B 103 and can be any other image forming apparatus (e.g., a printer or a multifunction peripheral).

A charging control server 104 manages charging information of each user, such as an available amount of money and print results collected from copying machines or other image forming apparatus. In the present exemplary embodiment of the present invention, the charging information is not limited to fee information and can include the number of prints or any other numerical information which can later be converted into the amount of money.

In the following exemplary embodiment of the present invention, the charging information is defined as a count value. The charging control server 104, the copying machine A 102, and the copying machine B 103 can use the count value as information describing the amount of money.

An authentication server 105 has a user authentication function. When a user logs in to the host computer 101, the authentication server 105 performs authentication according to a user identification (ID) and a password entered by the user and permits a user's log-in operation according to the authentication result. Similarly, the authentication server 105 performs authentication when a user operates the copying machine A 102 or the copying machine B 103. The authentication server 105 sets the user ID of an authenticated user as an owner name to a print job.

The host computer 101, the copying machine A 102, the copying machine B 103, the charging control server 104, and the authentication server 105 can communicate with each other via a network 106 according to Ethernet® or other publicly known communication technology.

Figure 2:
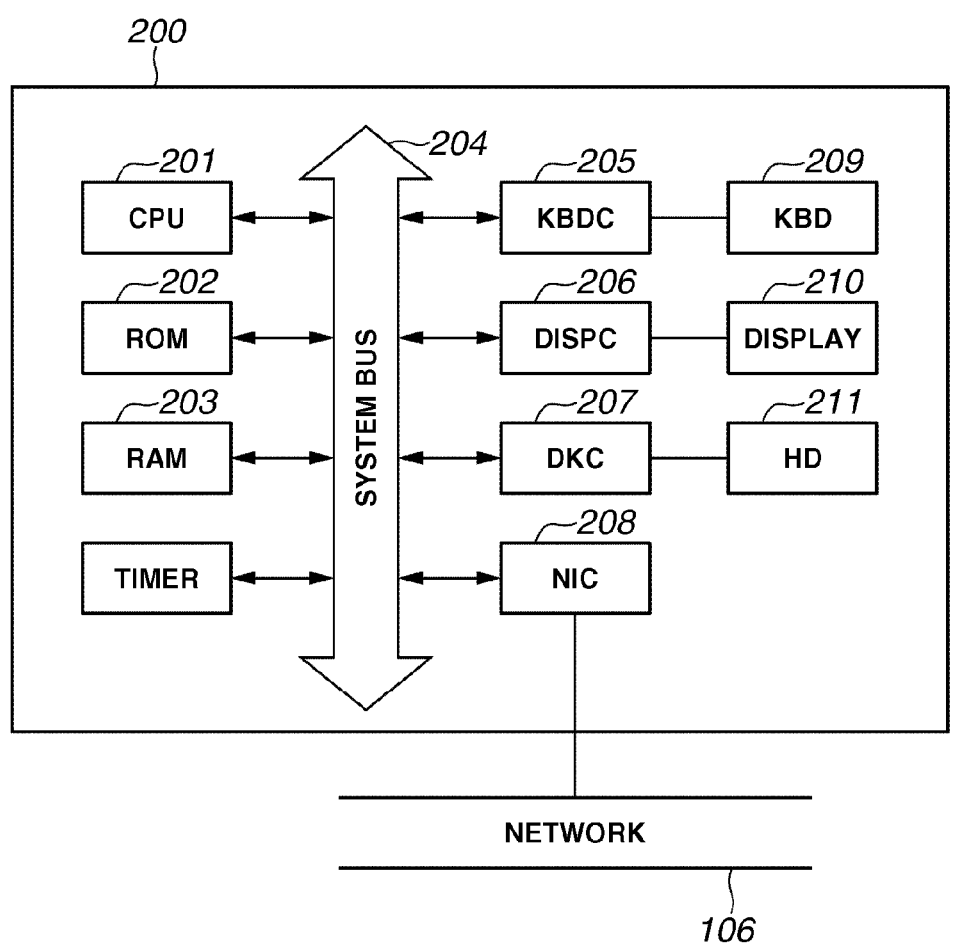
FIG. 2 is a block diagram illustrating a hardware configuration of a personal computer (PC) which can function as a host computer, a charging control server, and an authentication server according to the first exemplary embodiment of the present invention.

FIG. 2 is a block diagram illustrating an exemplary hardware configuration of a PC 200 which can function as the host computer 101, the charging control server 104, and the authentication server 105.

Referring to FIG. 2, a central processing unit (CPU) 201 executes application programs stored on a read only memory (ROM) 202 or a hard disk (HD) 211. The CPU 201 can control each device connected to a system bus 204.

A random access memory (RAM) 203 functions as a main memory or a work area for the CPU 201.

A keyboard controller (KBDC) 205 controls instructions input via a keyboard 209.

A display controller (DISPC) 206 controls a display module (DISPLAY) 210 which includes, for example, a liquid crystal display.

A disk controller (DKC) 207 controls the HD 211 which is a mass storage device.

A network interface card (NIC) 208 can perform interactive data communications, via the network 106, with other PCs, servers, and peripheral apparatuses.

Figure 3:
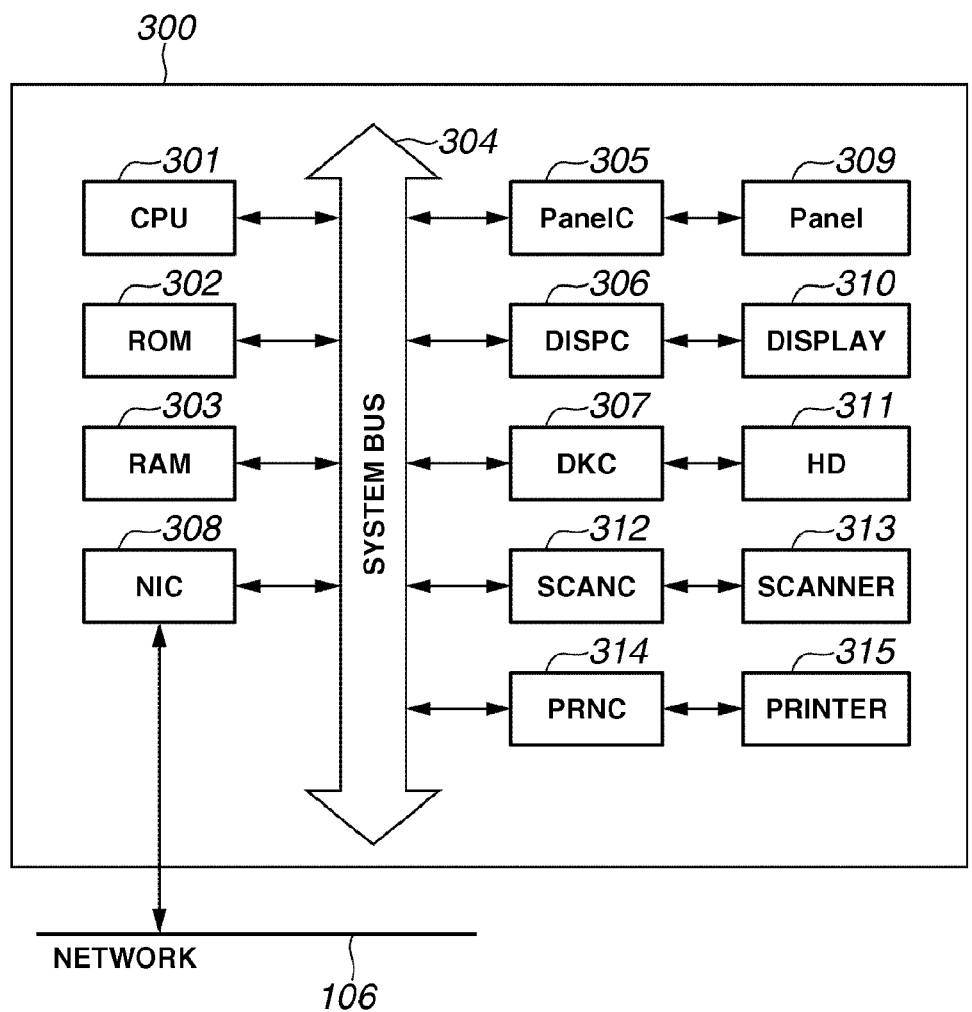
FIG. 3 is a block diagram illustrating a hardware configuration of a copying machine according to the first exemplary embodiment of the present invention.

FIG. 3 is a block diagram illustrating an exemplary hardware configuration 300 of the copying machine A 102 or the copying machine B 103.

A CPU 301 executes application programs stored on a ROM 302 or on an HD 311. Furthermore, the CPU 301 can control each device connected to a system bus 304.

A RAM 303 functions as a main memory or a work area of the CPU 301.

A panel controller (PanelC) 305 controls instructions input through an operation panel (Panel) 309 of the copying machine.

A display controller (DISPC) 306 controls a display module (DISPLAY) 310 which includes, for example, a liquid crystal display.

A disk controller (DKC) 307 controls the (HD) 311 which is a mass storage device.

A network interface card (NIC) 308 can perform interactive communications with PCs and servers via the network 106.

A scanner controller (SCANC) 312 controls an optical scanner 313 of the copying machine that reads a document.

A printer controller (PRNC) 314 controls a printer 315 of the copying machine which performs printing according to a publicly known printing method (e.g., an electrophotographic printing method, an inkjet printing method, etc).

Figure 4:
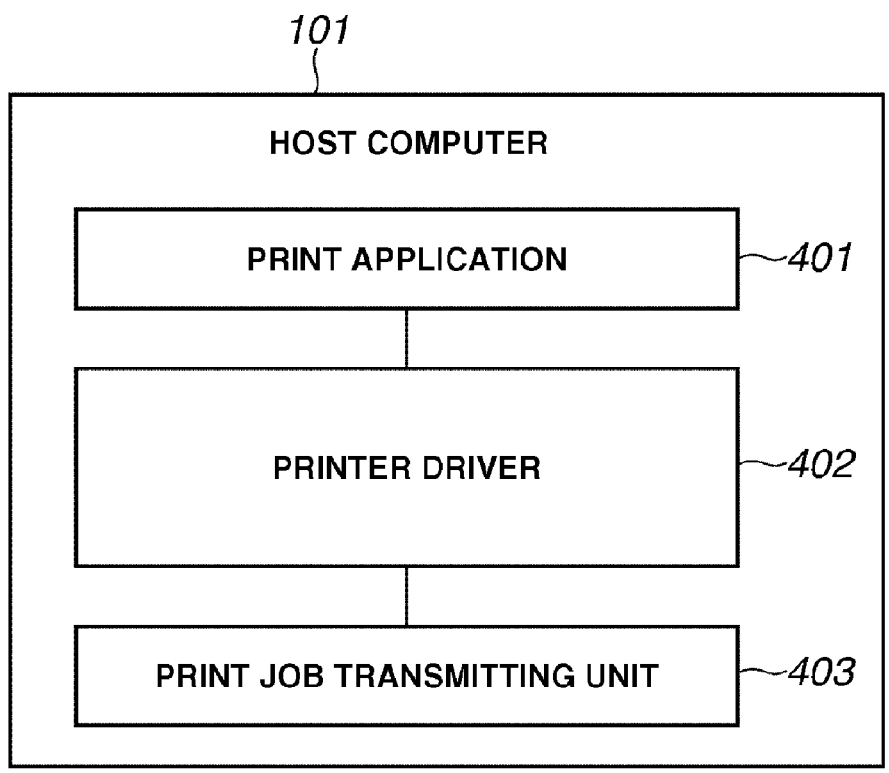
FIG. 4 is a block diagram illustrating a module configuration of the host computer according to the first exemplary embodiment of the present invention.

FIG. 4 is a block diagram illustrating an exemplary module configuration of the host computer 101.

As illustrated in FIG. 4, the host computer 101 includes an application 401, a printer driver 402, and a print job transmitting unit 403. The application 401 generates a printing instruction (e.g., a drawing command) and transmits the generated instruction to the printer driver 402.

The printer driver 402 converts a drawing command received from the application 401 into print data, i.e., page description language (PDL), which the copying machine can interpret. Furthermore, the printer driver 402 generates a print job including print data and job owner information (user name) describing a name of a user who has instructed the printing via the application 401, and transmits the generated print job to the print job transmitting unit 403. The user name can be ID information that identifies each user.

The print job transmitting unit 403 receives the print job from the printer driver 402 and transmits the received print job to an external peripheral apparatus via the network.

Figure 5:
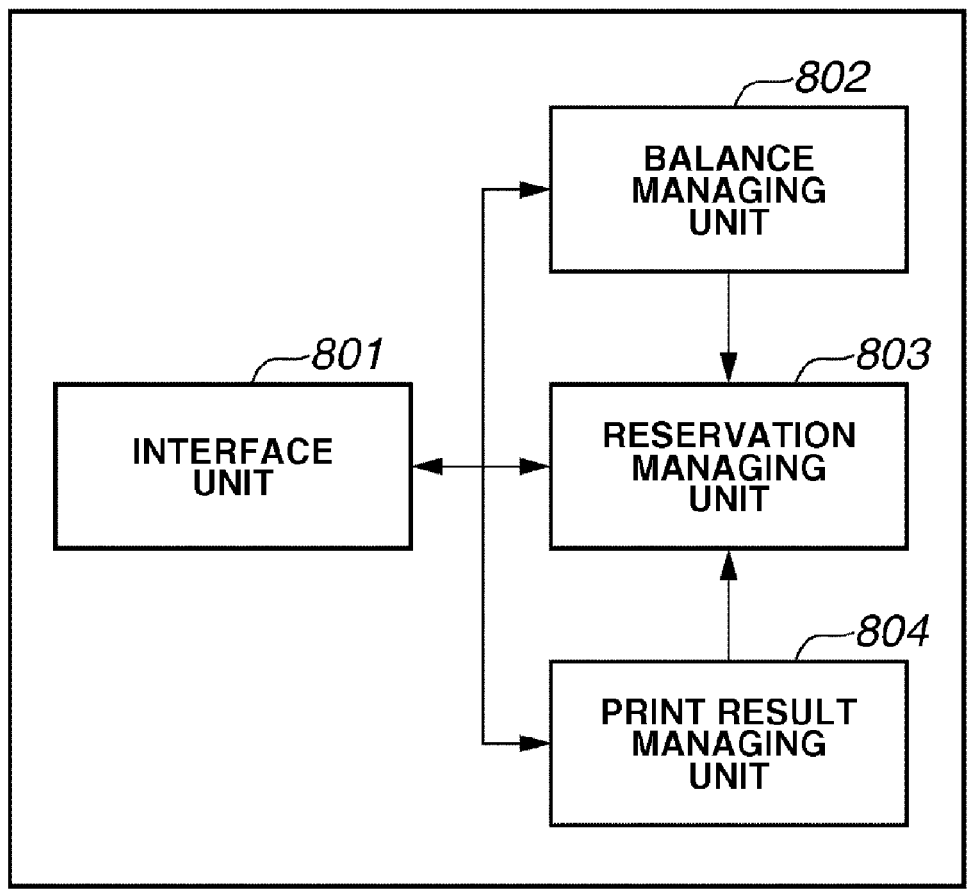
FIG. 5 is a block diagram illustrating a module configuration of the charging control server according to the first exemplary embodiment of the present invention.

FIG. 5 is a block diagram illustrating an exemplary module configuration of the charging control server 104.

Referring to FIG. 5, the charging control server 104 includes an interface unit 801, a balance managing unit 802, a reservation managing unit 803, and a print result managing unit 804. The interface unit 801 can communicate, via the NIC 208, with each copying machine connected to the network 106.

The balance managing unit 802 manages the remaining deposit and a total of reservation fees for each user. The remaining deposit represents an amount of money that a user can currently use if a deposit limit is set for each user. In the present exemplary embodiment, the balance managing unit 802 obtains the remaining deposit by subtracting an expenditure sum from the deposit limit.

The reservation managing unit 803 receives a reservation request notification from each copying machine, and manages the reservation fee for each job. In the present exemplary embodiment, the reservation fee is an amount of money actually required for reserving a print job. The reservation fee is required as a deposit of an actual fee for a print job, and thus is assumed to be included in the actual fee for a print job. The reservation request includes a job ID, a user name (job owner), and a reservation fee.

The print result managing unit 804 receives a print result notification from each copying machine, and obtains the information about a job ID, a user name (job owner), and an expenditure sum included in the print result notification. Then, the print result managing unit 804 performs later-described print result add-up processing.

Figure 6:
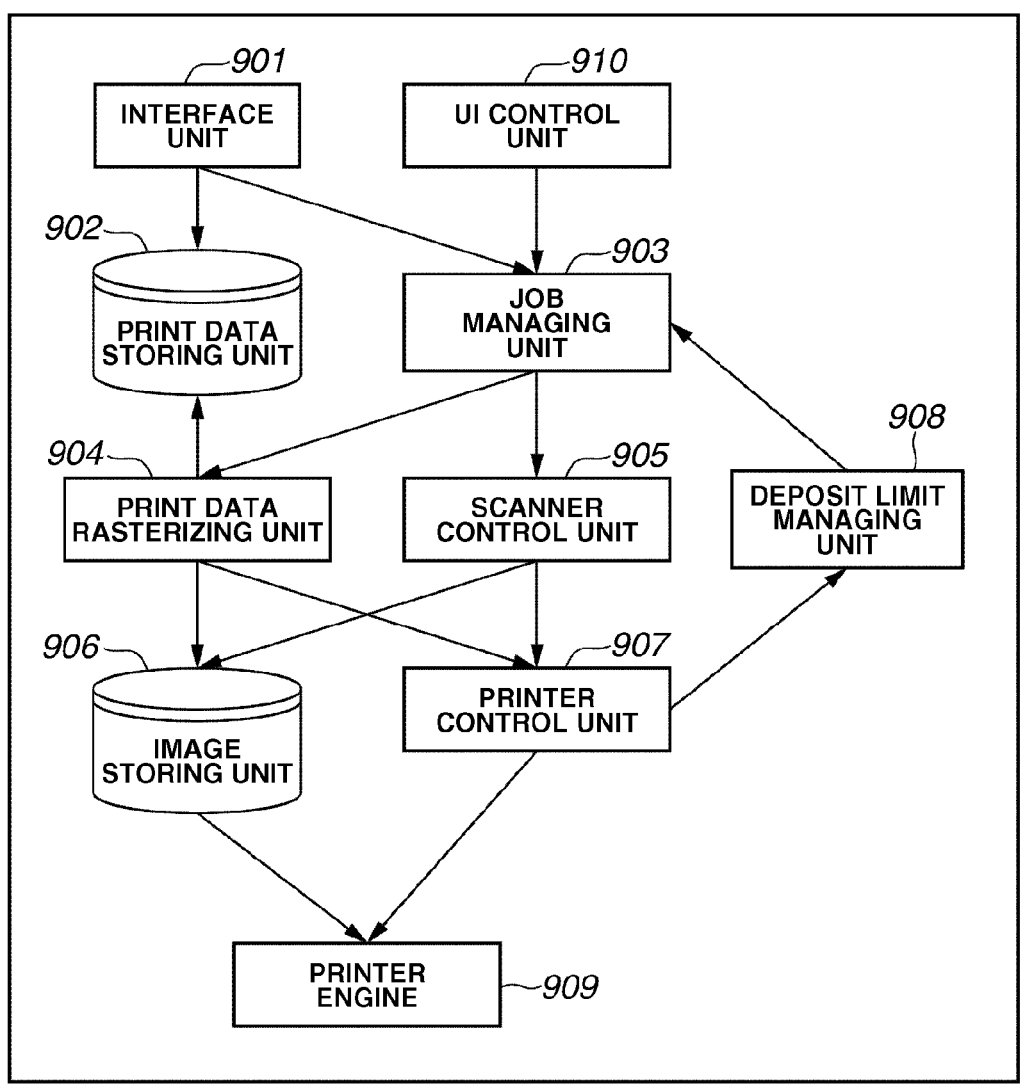
FIG. 6 illustrates a module configuration of the copying machine according to the first exemplary embodiment of the present invention.

FIG. 6 illustrates an exemplary module configuration of the copying machine A 102 and the copying machine B 103.

Referring to FIG. 6, an interface unit 901, connected to the network 106, receives a print job and various information from the host computer 101.

A print data storing unit 902 temporarily stores print job data.

A user interface (UI) control unit 910 controls the operation panel 309 via the panel controller (PanelC) 305, and receives a log-in request or a copy instruction from a user who desires to use the copying machine. When a log-in request is received, the UI control unit 910 accesses, via the NIC 308, the authentication server 105 to perform user authentication.

A job managing unit 903 analyzes a print job, obtains output attribute information (e.g., number of prints (copies), information about whether the print job is to be printed in a color printing mode or a monochromatic printing mode, etc), and manages job information including the obtained attribute information. Furthermore, the job managing unit 903 holds, as job information, a deposit limit previously set for each print job and an expenditure sum. Moreover, the job managing unit 903 holds a charge table that stores a printing fee per page.

In the present exemplary embodiment, "analysis" refers to processing for obtaining output attribute information required in calculating information about a charged fee for printing print data included in a print job. Furthermore, "analysis" can be regarded as referring to sequential processing including acquirement of output attribute information of a print job and calculation of a charged fee. Details of the job information will be described below.

A print data rasterizing unit 904 generates intermediate data according to PDL data of the print job stored in the job managing unit 903 and performs image generation processing to generate image data. In the present invention, the processing for generating image data based on PDL data is referred to as "rasterization processing" or "rasterization". In a later-described exemplary embodiment, the job managing unit 903 analyzes a print job while the print data rasterizing unit 904 performs rasterization processing. In the following description, the rasterization processing can include "analysis" unless otherwise described.

A scanner control unit 905 controls the scanner controller 312 and causes the scanner 313 to read a document to generate image data.

An image storing unit 906 temporarily stores image data generated by the print data rasterizing unit 904 and the scanner control unit 905.

A printer control unit 907 controls a printer engine to print the image data stored in the image storing unit 906.

A deposit limit managing unit 908 sends a reservation request to the charging control server 104 with reference to the job information including the deposit limit set for each print job.

A printer engine 909 can print, on a printing sheet or other medium, image data stored in the image storing unit 906 using a publicly known printing method (an electrophotographic printing method, an inkjet printing method, etc).

FIG. 7 illustrates an exemplary authentication information management table used by the authentication server 105 that manages authentication information for each user.

In the authentication information management table illustrated in FIG. 7, each row describes an entry of each user and each column describes authentication information (e.g., user name 501, password 502) of each user.

An entry 511 describes character strings representing user authentication information, such as user name "User1" and password "123". Similarly, entries 512 and 513 respectively describe authentication information of other users.

A user, who logs in to the host computer 101, enters a user name and a password. The authentication server 105 receives the entered information, collates the user name and the password, and notifies log-in permission to the user, if the user is successfully authenticated, via the display module 210 of the host computer 101.

The information of a user logged-on to the host computer 101 can be obtained from the operating system (OS). Furthermore, the printer driver 402 obtains a name of a log-in user who has instructed printing, and adds the obtained log-in user name, as job owner information, to a print job when the printer driver 402 generates the print job. Each copying machine can identify a user of a print job according to the job owner information added to the print job.

FIG. 8 illustrates an exemplary reservation management table used by the reservation managing unit 803 of the charging control server 104 that manages reservation information for each job.

Referring to FIG. 8, the job entry of each row includes a job ID 701, a user name 702, and a reservation fee 703. When a reservation request is received from the copying machine A 102, the reservation managing unit 803 registers the information to the reservation management table according to the job ID, the user name (job owner), and the reservation request fee included in the reservation request.

The job entry 711 in the first row includes a job ID "01", a user name "User1" (i.e., user ID of the job owner), and a reservation fee of 120 yen. The job entry 712 in the second row includes a job ID "02", a user name "User2", and a reservation fee of 300 yen. The job entry 713 in the third row includes a job ID of "03", a user name "User3", and a reservation fee of 210 yen.

Figure 9:
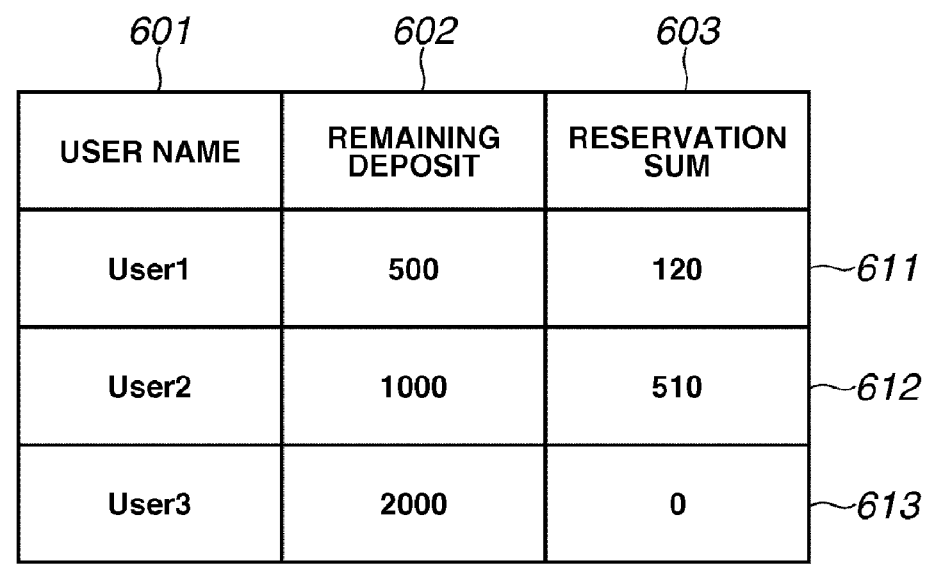

FIG. 9 illustrates an exemplary balance management table used by the balance managing unit 802 of the charging control server 104 that manages remaining deposit information for each user.

Referring to FIG. 9, the entry in each row describes a user name 601, a remaining deposit 602 of the user, and a reservation sum 603 of each user. The reservation sum 603 describes a total of charged money for the reservations.

In the present exemplary embodiment, when the balance managing unit 802 receives a reservation request notification from the copying machine A 102 that performs print processing, the balance managing unit 802 adds a reservation fee to the reservation sum of a corresponding user according to the user name (job owner) and reservation fee information included in the reservation request.

The currency unit is not limited to "yen" and any other currency unit can be used in the present exemplary embodiment.

The entry 611 in the first row includes a user name "User1", a remaining deposit equivalent to 500 yen, and a reservation sum equivalent to 120 yen. In this case, the deposit currently available for the user "User1" is 380 yen which can be obtained by subtracting the reservation sum from the remaining deposit.

The entry 612 in the second row includes a user name "User2", a remaining deposit equivalent to 1,000 yen, and a reservation sum equivalent to 510 yen. In this case, the reservation sum is equivalent to a sum of the reservation fees of job IDs 02 and 03 in FIG. 8.

The entry 613 in the third row includes a user name "User3", a remaining deposit equivalent to 2,000 yen, and a reservation sum equivalent to 0 yen.

The charging control server 104 manages the reservation fee for each job with reference to the reservation management table illustrated in FIG. 8 and manages user information (e.g., remaining deposit and currently reserved amount of money) with reference to the balance management table illustrated in FIG. 9.

Furthermore, the print result managing unit 804 performs the following processing when a print result notification is received from the copying machine. The print result managing unit 804 obtains information including a job ID, a user name (job owner), and an expenditure sum from the print result notification.

The print result managing unit 804 performs print result add-up processing according to the obtained information. The print result add-up processing includes identifying job information from the reservation management table of FIG. 8 according to the job ID and the user name included in the print result notification, obtaining a reservation fee for the identified job, and deleting the identified job information from the reservation management table.

Furthermore, the print result add-up processing includes identifying user information in the balance management table of FIG. 9 according to the user name, subtracting the expenditure sum from the remaining deposit, and updating the remaining deposit amount according to the obtained amount of money.

Moreover, the print result add-up processing includes subtracting the job reservation fee (obtained from the reservation management table of FIG. 8 according to the job ID and the user name) from the reservation sum, and updating the reservation sum according to the obtained amount of money.

If the expenditure sum is different from the reservation fee(s), for example, when a user forcibly interrupts a printing operation, or when a malfunction occurs in the copying machine, the print result managing unit 804 performs the following processing. First, the print result managing unit 804 performs print result add-up processing according to the print result notification. Then, the print result managing unit 804 compares the reservation fee(s) with the expenditure sum. If there is a difference between the compared data, the print result managing unit 804 can cause the copying machine to display a message notifying a user about unsuccessfully finished printing together with the print result and the reservation fee information.

FIG. 10 illustrates an exemplary job information management table used by the job managing unit 903 of the copying machine A 102 or the copying machine B 103 that manages print job information.

In the job information management table illustrated in FIG. 10, a job ID 1001 identifies a print job, a user name 1002 identifies a user (i.e., print job owner), and a deposit limit 1003 indicates an amount of money usable for charging the reservation which is set for each print job.

In the present exemplary embodiment, the deposit limit 1003 is a preset value set for enabling the copying machine to make a reservation request for a part of a print job when the copying machine performs printing of this print job. More specifically, the deposit limit 1003 indicates an upper limit of money set for each print job for temporarily performing printing. In the present exemplary embodiment, a later-described reservation request is performed if a presumed expenditure amount exceeds the deposit limit.

The job information management table illustrated in FIG. 10 further includes an expenditure sum 1004, a rasterized page fee 1005, and a number of copies 1006.

The expenditure sum 1004 indicates a total amount of money required for completing the printing of a designated print job. For example, every time printing of one page of a print job is completed, the job managing unit 903 increases the expenditure sum 1004 of this print job by adding a printing fee calculated according to the attributes (e.g., color/monochrome, sheet size, etc) of the printed page.

The rasterized page fee 1005 indicates a total amount of money charged when rasterized (or scanned) pages of the print job are actually printed. In this case, the present exemplary embodiment automatically calculates the fee(s) required for printing image data when generated according to rasterization processing applied to a print job and sets the rasterized page fee according to the calculated fee(s).

FIG. 11 illustrates an exemplary charged fee table used by the job managing unit 903 of the copying machine A 102 or the copying machine B 103 that manages charged fees according to print settings of print processing.

The charged fee table illustrated in FIG. 11 includes charged fees determined with reference to combinations of the print setting (e.g., color 1111 or monochrome 1112) and the sheet size (small or large). For example, when the printing setting is color and the sheet size is small, the charged fee is 50 yen.

For example, the sheet size equivalent to A4 or smaller is classified as "small" and the sheet size larger than A4 is classified as "large".

Although the present exemplary embodiment sets and manages the printing fee with reference to the color/monochrome setting and the small/large sheet size, it is also useful to set and manage the fee for each of the known sheet sizes (A4, A5, . . . ), or depending on other print settings (e.g., staple function, bookbinding function, etc). Furthermore, it is also useful to determine the fee depending on the type of job (e.g., print processing, copy processing, etc).

Now, an exemplary charging control according to a print instruction from the host computer will be described with reference to FIGS. 12 through 16.

Figure 12:
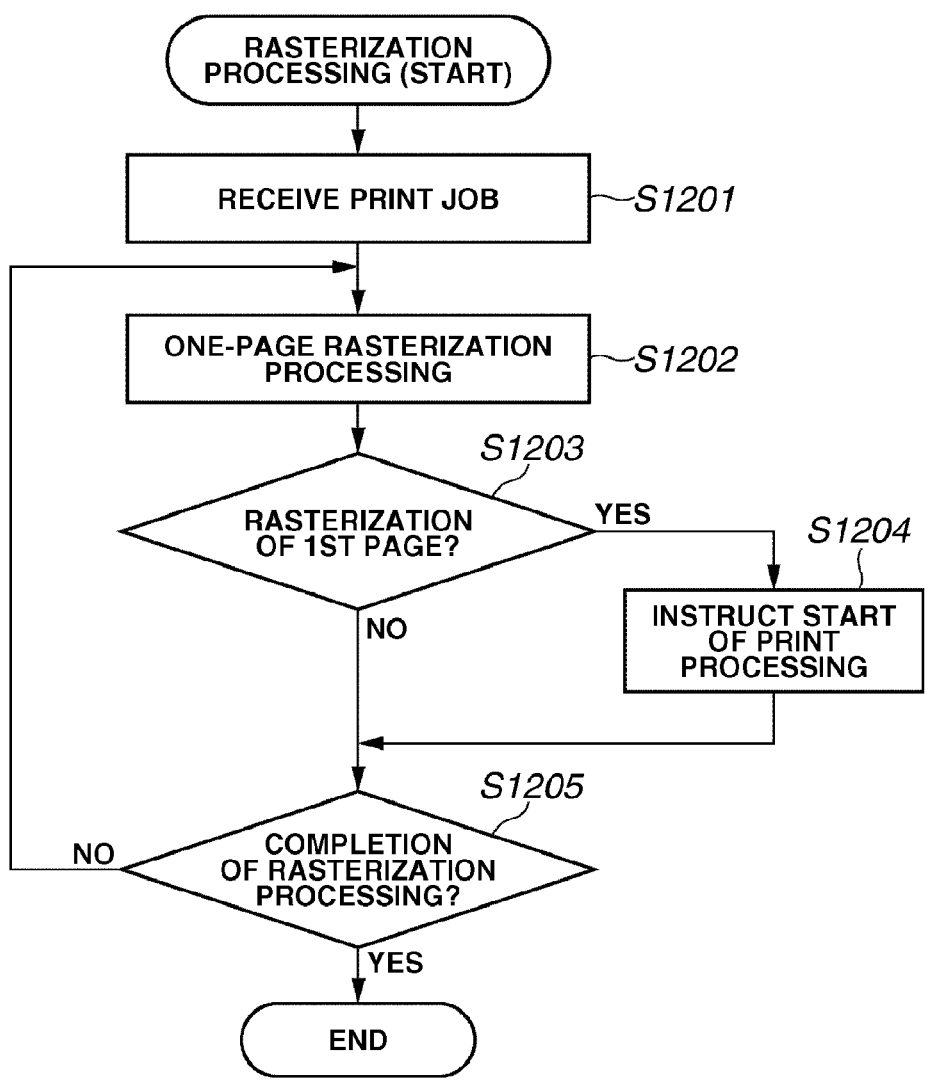
FIG. 12 is a flow chart illustrating print job reception and print job rasterization processing performed by the copying machine according to the first exemplary embodiment of the present invention.

FIG. 12 is a flow chart illustrating exemplary print job rasterization processing performed by each copying machine.

Figure 13:
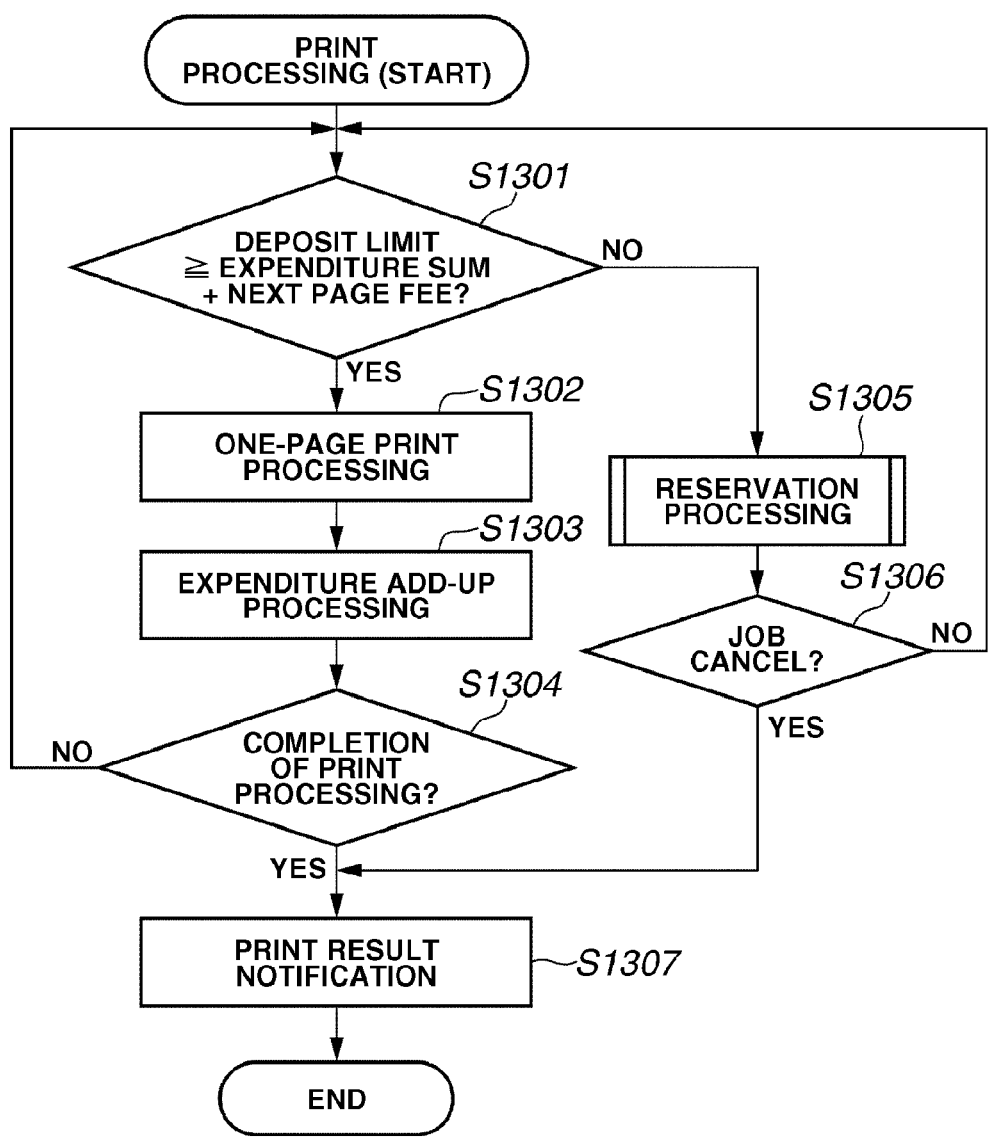
FIG. 13 is a flow chart illustrating print processing performed by the copying machine according to the first exemplary embodiment of the present invention.
Figure 14:
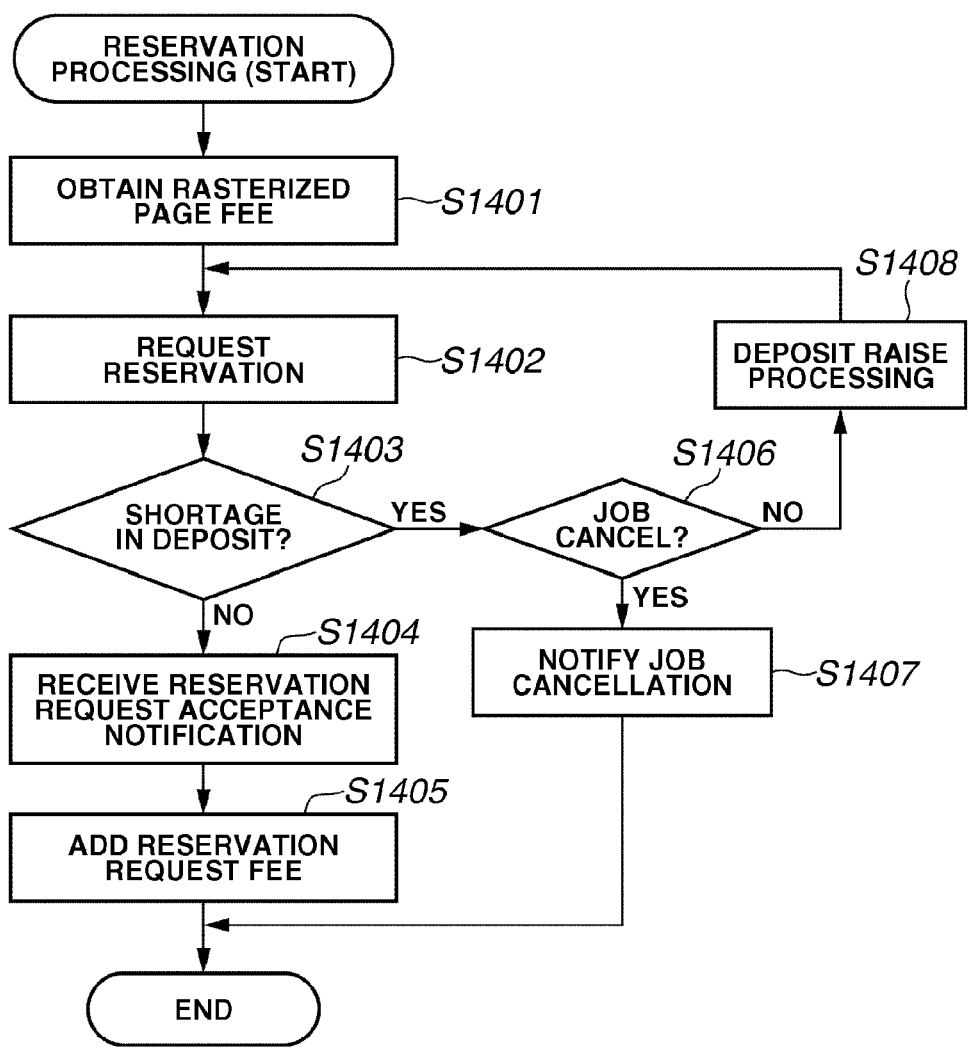
FIG. 14 is a flow chart illustrating reservation processing performed by the copying machine according to the first exemplary embodiment of the present invention.

FIG. 13 is a flow chart illustrating exemplary print processing, including processing by the printer engine that performs printing of image data. FIG. 14 is a flow chart illustrating exemplary reservation processing performed by each copying machine. The software program corresponding to the flow charts illustrated in FIGS. 12 through 14 can be stored on the RAM 303 or the ROM 302 illustrated in FIG. 3 and can be executed by the CPU 301.

Figure 15:
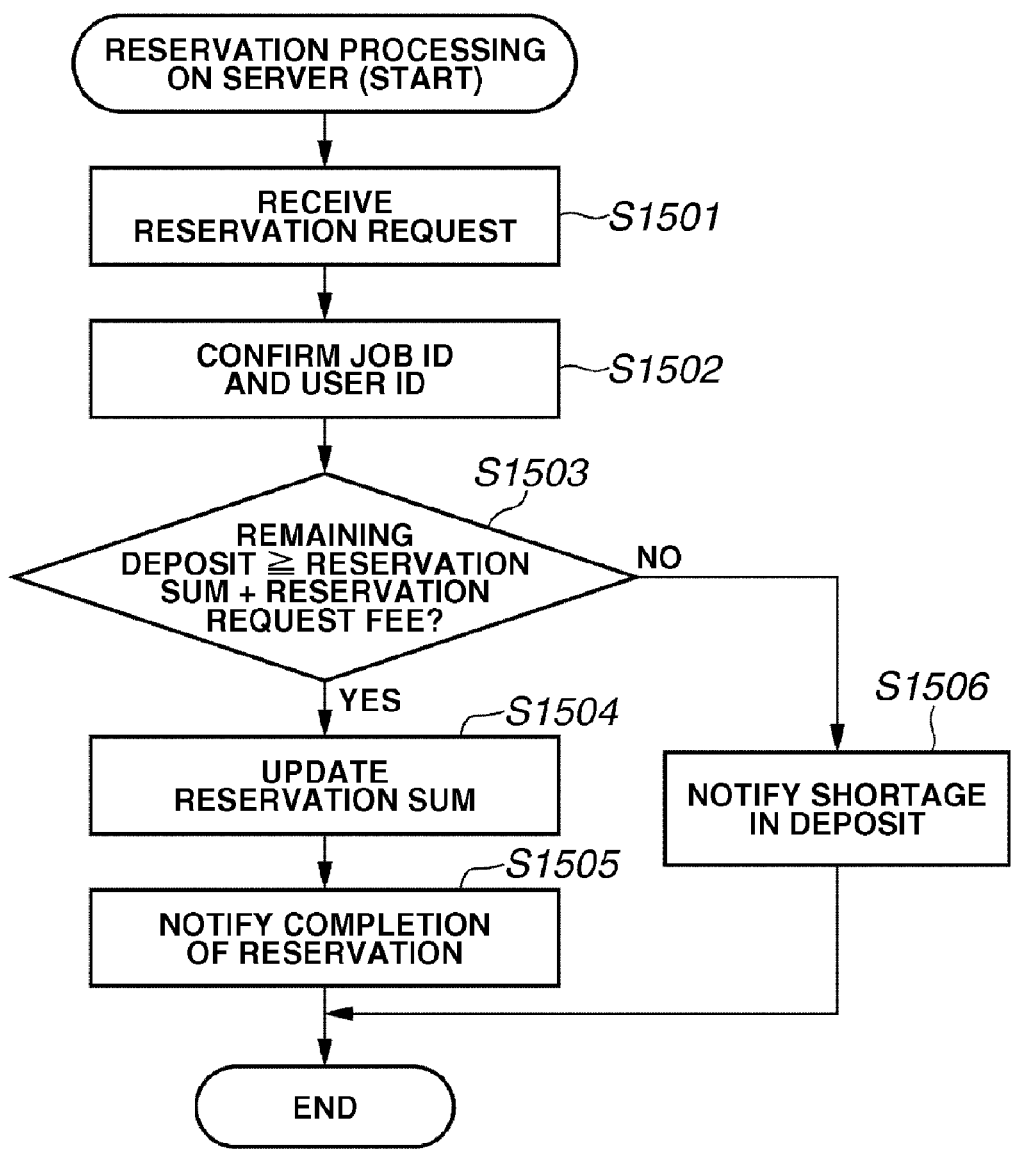
FIG. 15 is a flow chart illustrating reservation processing performed by the charging control server in response to a reservation request according to the first exemplary embodiment of the present invention.
Figure 16:
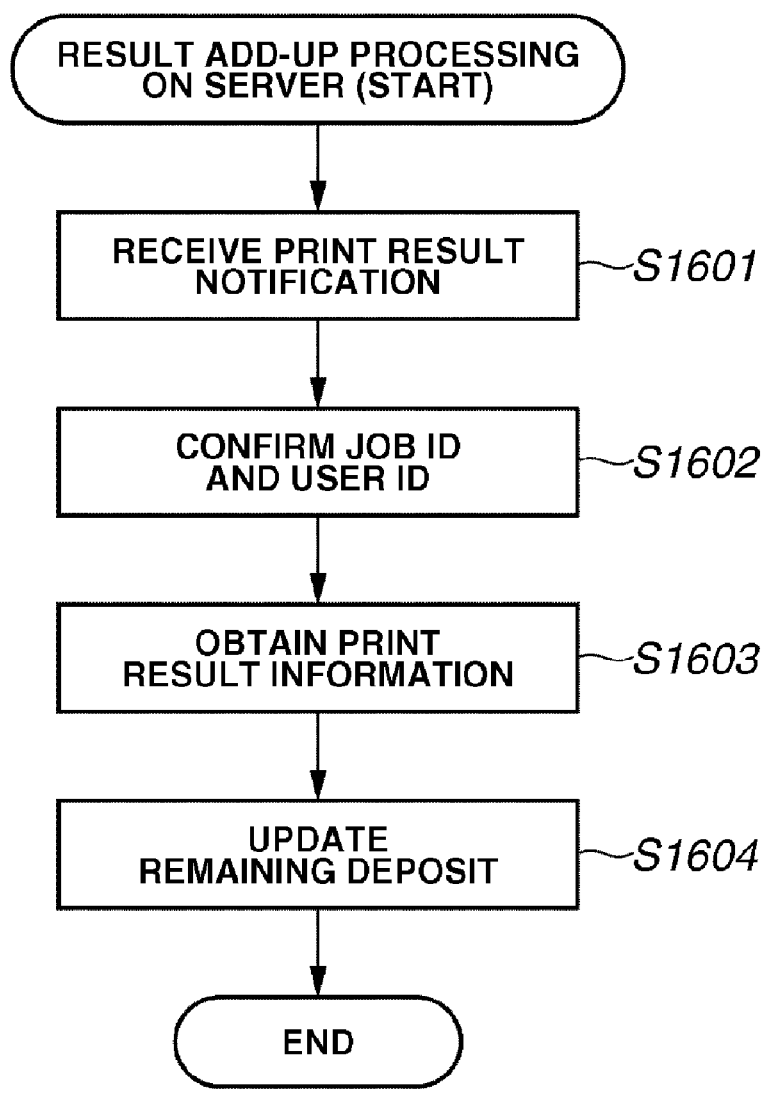
FIG. 16 is a flow chart illustrating print result add-up processing performed by the charging control server in response to a print result notification according to the first exemplary embodiment of the present invention.

FIG. 15 is a flow chart illustrating exemplary reservation processing performed by the charging control server 104. FIG. 16 is a flow chart illustrating exemplary print result add-up processing performed by the charging control server 104. The software program corresponding to the flow charts illustrated in FIGS. 15 and 16 can be stored on the RAM 203 or the ROM 202 illustrated in FIG. 2 and can be executed by the CPU 201.

FIG. 12 is a flow chart illustrating exemplary print job reception and print job rasterization processing performed by the copying machine.

Referring to FIG. 12, in step S1201, the copying machine receives a print job. The interface unit 901 receives the print job transmitted from the host computer 101, and stores print data in the print data storing unit 902. Then, the interface unit 901 notifies the job managing unit 903 of information of the received print job. The job managing unit 903 registers the job information to the job information management table illustrated in FIG. 10. Then, the job managing unit 903 instructs the print data rasterizing unit 904 to start job rasterization processing.

In step S1202, the print data rasterizing unit 904 obtains the print data from the print data storing unit 902, performs image generation processing according to print settings for the print job to generate image data, and stores the generated image data of each page into the image storing unit 906.

At this time, the print data rasterizing unit 904 determines whether the rasterized image includes color data or includes monochrome data only. The print data rasterizing unit 904 stores page information including color/monochrome information and the printing sheet size into the image storing unit 906, and notifies the page information to the job managing unit 903.

The job managing unit 903 searches a fee for one page with reference to the charged fee table illustrated in FIG. 11, and adds the obtained fee to the rasterized page fee 1005 of the job information management table illustrated in FIG. 10. For example, when the rasterization processing for a print job is entirely completed, the rasterized page fee becomes equal to the total charged fees of all pages included in the print job.

In step S1203, the print data rasterizing unit 904 determines whether the page having been rasterized in step S1202 is a first page of the print job. At this time, the print data rasterizing unit 904 has already identified the page number of each rasterized page of the received print job. If the print data rasterizing unit 904 determines that the rasterized page is the first page (Yes in step S1203), the processing flow proceeds to step S1204. On the other hand, if the rasterized page is other than the first page (No in step S1203), the processing flow proceeds to step S1205.

In step S1204, the print data rasterizing unit 904 instructs the printer control unit 907 to start print processing. Then, the processing flow proceeds to step S1205 to repeat the rasterization processing if the rasterization processing for the print job has not been completed.

As apparent from the above description, the present exemplary embodiment enables the copying machine to start print processing while it continues the rasterization processing. Namely, the rasterization processing can be concurrently performed with the print processing or reservation processing.

In step S1205, the print data rasterizing unit 904 determines whether all the pages of the print job received in step S1201 have been completely rasterized. If the print data rasterizing unit 904 determines that the print job has a next page to be rasterized (No in step S1205), the processing flow returns to step S1202. In step S1202, the print data rasterizing unit 904 continues the rasterization processing for the next page. On the other hand, if the print job has no page to be rasterized (Yes in step S1205), the print data rasterizing unit 904 determines that the rasterization processing on the print job received in step S1201 has been completed. Thus, the print data rasterizing unit 904 terminates the processing of this routine.

FIG. 13 is a flow chart illustrating exemplary print processing performed by the copying machine.

Referring to FIG. 13, in step S1301, before the copying machine starts printing of a page, the printer control unit 907 compares an expenditure sum including a print job of the next page with the deposit limit set for the print job. The printer control unit 907 obtains information (e.g., color/monochrome, printing sheet size, etc) of the next page from the image storing unit 906, and searches a fee for the next page with reference to the charge table of the job managing unit 903. Furthermore, the printer control unit 907 obtains a deposit limit and an expenditure sum of the print job received in step S1201 of FIG. 12, with reference to the job information management table.

Deposit limit≧expenditure sum+next page fee    (i)

If the printer control unit 907 determines that the above-described formula (i) is satisfied (Yes in step S1301), the processing flow proceeds to step S1302. On the other hand, if the formula (i) is not satisfied (No in step S1301), the processing flow proceeds to step S1305.

In step S1302, the printer control unit 907 sends a print instruction signal to the printer engine 909. In response to the instruction signal, the printer engine 909 notifies the printer control unit 907 of a print-ready state. Then, the printer control unit 907 sends image data of one page having been rasterized to the printer engine 909 so that the printer engine 909 can perform printing according to print data.

In step S1303, the printer control unit 907 notifies the job managing unit 903 of expenditure for the completed printing of one page. The job managing unit 903 adds the printing fee for the received page to the expenditure sum 1004 in the job information management table.

In step S1304, the printer control unit 907 determines whether the printing of the print job received in step S1201 of FIG. 12 has been thoroughly completed. If the printer control unit 907 determines that the print job received in step S1201 of FIG. 12 includes a next page to be printed (No in step S1304), the processing flow returns to step S1301 to continue the print processing. On the other hand, if the printing of the entire job has been completed (Yes in step S1304), the printer control unit 907 notifies the job managing unit 903 about completion of the printing of the received print job. The processing flow proceeds to step S1307.

In step S1305, later-described reservation processing is performed. During the reservation processing, the printer control unit 907 temporarily stops the print processing. Meanwhile, the interface unit 901 continues print job reception processing and the print data rasterizing unit 904 continues print job rasterization which is required for image generation processing.

In step S1306, the printer control unit 907 determines whether print job cancellation is instructed to the job managing unit 903 during the reservation processing. If the printer control unit 907 determines that the job cancellation is instructed (Yes in step S1306), the processing flow proceeds to step S1307. On the other hand, if the printer control unit 907 determines that the job cancellation is not instructed (No in step S1306), the printer control unit 907 determines that the reservation processing has been accepted. The processing flow proceeds to step S1301 to perform the printing.

In step S1307, when the job managing unit 903 receives the print completion notification of the print job, the job managing unit 903 notifies the deposit limit managing unit 908 of job completion together with the expenditure required for the printing of the print job. Furthermore, if print job cancellation is notified in the later-described reservation processing, the job managing unit 903 notifies the deposit limit managing unit 908 of an expenditure for the interrupted printing of the print job.

Then, the job managing unit 903 writes a log indicating information of the completed print job into the HD or other storage medium, and deletes the job information. Then, the deposit limit managing unit 908 notifies the charging control server 104 of the expenditure notified from the job managing unit 903, for example, together with the job ID of the print job and the user ID of the job owner. The job managing unit 903 can use the above-described log for comparing or confirming the relationship between a print result having been charged and actual processing information.

FIG. 14 is a flow chart illustrating exemplary reservation processing performed by the copying machine.

Referring to FIG. 14, in step S1401, the deposit limit managing unit 908 obtains the rasterized page fee for a print job from the job managing unit 903.

In step S1402, the deposit limit managing unit 908 transmits reservation information (e.g., reservation request fee, job ID, and user ID of the job owner) to the charging control server 104 and requests reservation for an amount of money charged. Here, the deposit limit managing unit 908 calculates a reservation request fee (i.e., the amount of money required for the reservation request).

Reservation request fee=rasterized page fee−deposit limit    (ii)

The above-described formula (ii) is a calculation formula for calculating the reservation request fee. By subtracting the deposit limit from the rasterized page fee, the deposit limit managing unit 908 can calculate the reservation request fee which represents the fee for any pre-print rasterized page(s) whose charging is not yet reserved in the charging control server 104 at this moment.

In step S1403, the deposit limit managing unit 908 determines whether a deposit shortage notification is received from the charging control server 104. If the deposit limit managing unit 908 determines that the deposit shortage notification is not received (No in step S1403), the processing flow proceeds to step S1404. On the other hand, if the deposit shortage notification is received (Yes in step S1403), the processing flow proceeds to step S1406.

In step S1404, the deposit limit managing unit 908 receives a reservation request acceptance notification from the charging control server 104. The processing flow proceeds to step S1405.

In step S1405, according to the reservation request acceptance notification received in step S1404, the deposit limit managing unit 908 adds the amount of money corresponding to the reservation request fee calculated in step S1402 to a reservation limit value set for the print job. Through the above-described processing, the copying machine can perform printing of print data having been rasterized at the timing of the reservation request, by an amount of money having been newly reserved for the printing.

If the deposit limit managing unit 908 receives a deposit shortage notification (Yes in step S1403), the copy machine displays, on the display module 310, a message indicating the shortage in deposit and also displays a screen enabling a user to cancel the print job or raise the deposit.

In step S1406, the deposit limit managing unit 908 determines whether the user's instruction is job cancellation. If the deposit limit managing unit 908 determines that the user's instruction is job cancellation (Yes in step S1406), the processing flow proceeds to step S1407. If the user's instruction is not job cancellation (No in step S1406), the processing flow proceeds to step S1408. In the present exemplary embodiment, a user can instruct, via the operation panel 309, canceling the print job or raising the deposit.

In step S1407, when the user instructs cancellation of the print job, the deposit limit managing unit 908 notifies the job managing unit 903 of cancellation of the print job. The job managing unit 903 instructs the interface unit 901, the print data rasterizing unit 904, and the printer control unit 907 to cancel the print job. The interface unit 901, the print data rasterizing unit 904 and the printer control unit 907 respectively stop the print job processing and discard the print job data and the image data to cancel the print job.

In step S1408, the deposit limit managing unit 908 confirms user's deposit raise instruction by inquiring the charging control server 104 whether predetermined deposit raise processing has been performed by the user. In the present exemplary embodiment, as exemplary deposit raise processing, a user can remit the amount of money to be increased to the charging control server 104 via a client PC to complete the deposit raise.

However, the deposit raising method is not limited to the exemplary method described in the present exemplary embodiment. When the deposit limit managing unit 908 confirms completion of the deposit raise processing performed by a user, the processing flow returns to step S1402 to repeat the reservation request processing.

When the reservation acceptance processing of steps S1404 and S1405 or the job cancellation processing of step S1407 has been completed, the processing flow proceeds to step S1306 of the print processing routine illustrated in FIG. 13.

Figure 29:
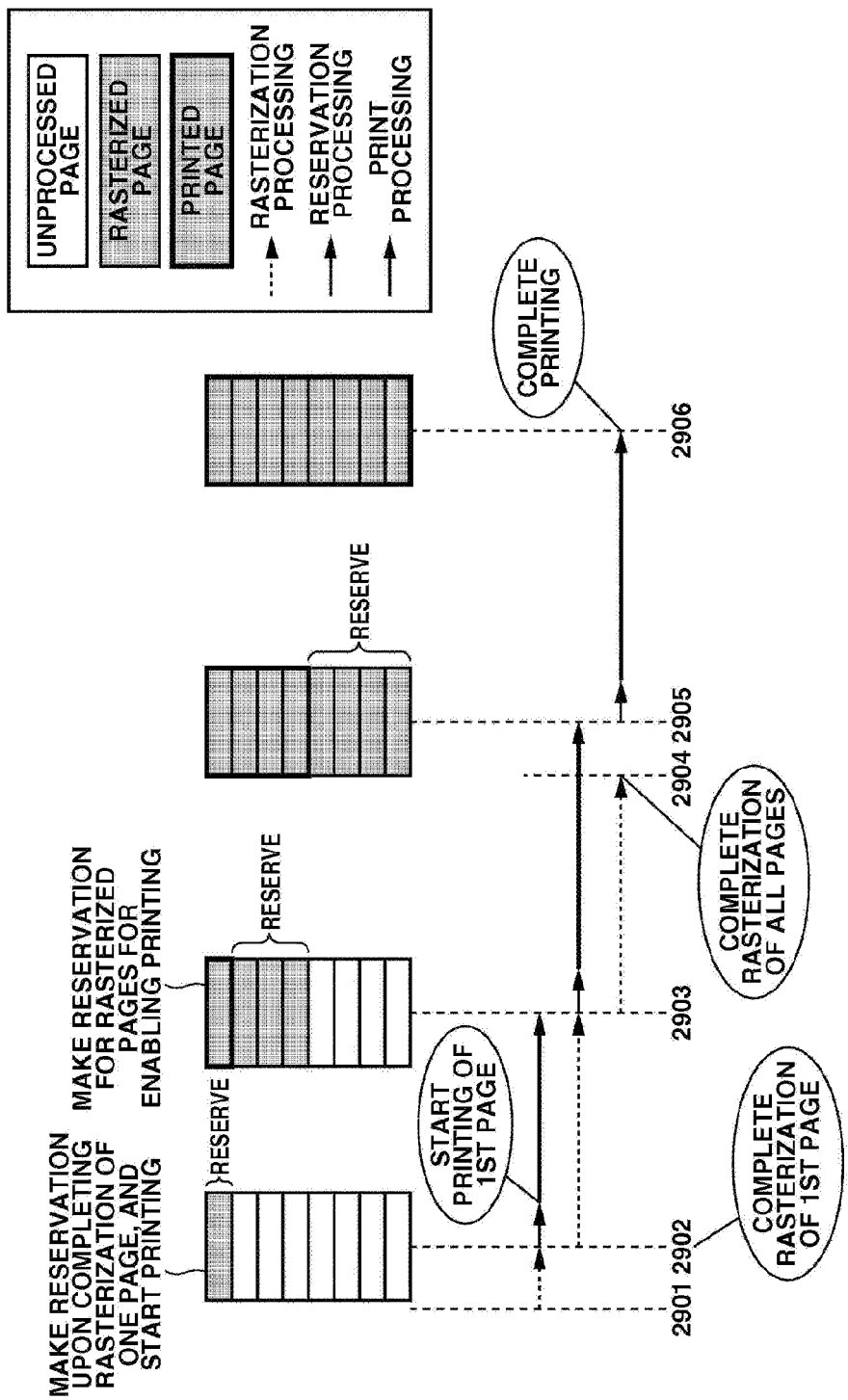
FIG. 29 is a timing chart illustrating the rasterization processing, reservation processing, and print processing performed by the copying machine according to the first exemplary embodiment of the present invention.

FIG. 29 is an exemplary timing chart illustrating rasterization processing, reservation processing, and print processing which can be performed concurrently. According to the timing chart of FIG. 29, an input job includes a total of eight pages to which rasterization processing, reservation processing, and print processing are successively applied.

Referring to FIG. 29, at timing 2901, the interface unit 901 inputs a print job. The print data rasterizing unit 904 starts rasterization processing.

At timing 2902, the print data rasterizing unit 904 completes the rasterization processing for a first page. In step S1204 of FIG. 12, the print data rasterizing unit 904 instructs the printer control unit 907 to start printing. Thereafter, the rasterization processing, the reservation processing, and the print processing are concurrently executed.

When the reservation processing for the first page has been completed, printing of the first page can be started. The rasterization processing for second and subsequent pages can be concurrently performed during the reservation processing and the print processing of the first page. The page having been rasterized at the timing 2902 is only the first page. Thus, the deposit limit managing unit 908 requests the charging control server 104 to reserve only the fee for the first page. The printer control unit 907 can start printing of only the first page.

At timing 2903, the printer control unit 907 completes the print processing for the first page. The printer control unit 907 temporarily stops the print processing before starting the printing of a second page. At this moment, the print data rasterizing unit 904 has already completed the rasterization processing for the first to fourth pages. Thus, the printer control unit 907 can resume the print processing for the second to fourth pages if the charging control server 104 completes reservation of the fees for the second to fourth pages according to a request from the deposit limit managing unit 908.

At timing 2904, the print data rasterizing unit 904 completes the rasterization processing for all pages of the print job.

At timing 2905, the printer control unit 907 completes the print processing for the first to fourth pages and the deposit limit managing unit 908 starts reservation processing for fifth and subsequent pages. As the reservation processing for the first to fourth pages has been already completed, it is required to additionally perform reservation processing for the fifth to eighth pages before starting the printing of the fifth to eighth pages.

At this moment, rasterization processing for all pages included in the print job has been already completed. Thus, the printer control unit 907 can resume the print processing for the fifth to eighth pages if the charging control server 104 completes reservation of the fees for the fifth to eighth pages according to a request from the deposit limit managing unit 908.

At timing 2906, the printer control unit 907 completes the print processing for all pages.

As described above, the present exemplary embodiment can concurrently perform the rasterization processing together with the print processing or the reservation processing by successively performing the reservation processing and the print processing for a part of the pages having been rasterized. Thus, the present exemplary embodiment can improve the processing speed and reduce the processing time required for printing a first page.

FIG. 15 is a flow chart illustrating reservation processing performed by the charging control server 104 in response to a reservation request received from the copying machine.

Referring to FIG. 15, in step S1501, the charging control server 104 receives a reservation request from the copying machine. The reservation managing unit 803 processes the reservation request received via the interface unit 801.

In step S1502, the reservation managing unit 803 confirms a job ID and a user ID included in the reservation request. The reservation managing unit 803 obtains user information (e.g., remaining deposit 602, reservation sum 603) according to these IDs from the balance management table (FIG. 9).

In step S1503, the reservation managing unit 803 determines whether the reservation request can be accepted according to the following evaluation formula (iii).

Remaining deposit−reservation sum≧reservation request fee     (iii)

If the evaluation formula (iii) is satisfied (Yes in step S1503), the processing flow proceeds to step S1504. On the other hand, if the evaluation formula (iii) is not satisfied (No in step S1503), the processing flow proceeds to step S1506.

The above-described evaluation formula is for obtaining a currently usable deposit by subtracting the reservation sum from the remaining deposit and evaluating whether the usable deposit is not less than the reservation request fee.

In step S1504, the reservation managing unit 803 accepts the reservation request and updates the balance management table (FIG. 9) by adding the reservation request fee to the reservation sum 603 of a user designated according to the user ID included in the reservation request. Furthermore, the reservation managing unit 803 updates the reservation management table (FIG. 8) by adding the reservation information.

If a corresponding job ID is not present in the reservation management table, the reservation managing unit 803 adds a new entry and sets the reservation request fee to the reservation fee 703. If the corresponding job ID is present in the reservation management table, the reservation managing unit 803 updates the reservation management table by adding the reservation request fee to the reservation fee 703 of the corresponding entry.

In step S1505, the reservation managing unit 803 notifies acceptance of the reservation request, via the interface unit 801, to the deposit limit managing unit 908 of the copying machine.

In step S1506, the reservation managing unit 803 notifies the shortage in user's available deposit, via the interface unit 801, to the deposit limit managing unit 908 of the copying machine.

Through the above-described processing, the charging control server 104 can accomplish the reservation processing in response to a reservation request received from the copying machine.

FIG. 16 is a flow chart illustrating exemplary print result add-up processing performed by the charging control server 104 in response to a print result notification received from the copying machine.

Referring to FIG. 16, in step S1601, the charging control server 104 receives a print result notification of a print job. The print result notification is sent via the interface unit 801 to the print result managing unit 804.

In step S1602, the print result managing unit 804 confirms a job ID and a user ID included in the print result notification.

In step S1603, the print result managing unit 804 searches a print job corresponding to the job ID included in the print result notification confirmed in step S1602, from a reservation management table, and obtains the reservation fee 703. Furthermore, the print result managing unit 804 searches, from a balance information table, a user corresponding to the user ID included in the print result notification confirmed in step S1602. The print result managing unit 804 subtracts an expenditure sum of the job from the user's remaining deposit 602.

In step S1604, the print result managing unit 804 subtracts a job reservation fee from the reservation sum 603 of the corresponding user which is managed by the balance managing unit 802. Furthermore, the print result managing unit 804 deletes, from the reservation management table, the reservation information entry of the corresponding job which is managed by the reservation managing unit 803.

Through the above-described processing, the job reservation can be discarded. The expenditure sum can be reflected to the user's available deposit, and an actually required amount of money for the printing can be charged.

As described above, the first exemplary embodiment can concurrently execute the rasterization processing and the print processing or the reservation processing. Accordingly, the first exemplary embodiment can speedily accomplish the printing of a first page of a print job instructed by a user.

Furthermore, according to the present exemplary embodiment, the charging control server 104 performs charging reservation for only the currently printable pages. The charging control server 104 does not perform charging reservation for unprintable pages. For example, if a user instructs a plurality of print jobs to be performed in parallel, the charging system according to the present exemplary embodiment can effectively use the remaining deposit for each print job.

Furthermore, the reservation fee calculation in step S1301 is not limited to the above-described method. For example, the following method can be used to calculate the reservation fee in the reservation request, if the reservation request fee is small and frequently performing the reservation processing is not desirable.

The deposit limit managing unit 908 refers to the job information. If the rasterized page fee 1005 exceeds the deposit limit 1003, the deposit limit managing unit 908 requests reservation of a reservation request fee corresponding to the difference. If the charging control server 104 accepts the reservation, deposit limit managing unit 908 adds the reservation request fee to the deposit limit.

Alternatively, the deposit limit managing unit 908 can obtain an amount of money by subtracting the expenditure sum 1004 from the deposit limit 1003, with reference to the job information. If the obtained amount of money is not greater than a pre-designated amount of money, and when the deposit limit 1003 is smaller than the rasterized page fee 1005, the deposit limit managing unit 908 can perform reservation processing for a reservation request fee which is equivalent to an amount of money obtained by subtracting the deposit limit 1003 from the rasterized page fee 1005. Then, the deposit limit managing unit 908 performs the rest of the above-described processing of the first exemplary embodiment.

Alternatively, the deposit limit managing unit 908 can calculate a reservation request fee using the following evaluation formula that determines whether a product of printing ability PPM (i.e., page number printable during 1 minute) of the copying machine and a pre-designated coefficient is not less than an amount of money obtained by subtracting the expenditure sum 1004 from the deposit limit 1003.

PPM×coefficient≧deposit limit−expenditure sum     (iv)

When the above evaluation formula (iv) is satisfied, the deposit limit managing unit 908 can perform reservation processing for a reservation request fee which is equal to an amount of money obtained by subtracting the deposit limit 1003 from the rasterized page fee 1005. Then, the deposit limit managing unit 908 performs the rest of the above-described processing of the first exemplary embodiment. A user can determine the coefficient with reference to a processing speed of the system.

Furthermore, the print charging processing according to the above-described exemplary embodiment is not limited to the above-described exemplary embodiment which performs the processing when a copying machine receives a print job from the host computer. The print charging processing can also be performed when a user instructs copy processing on a copying machine as will be described below.

When a user inputs a copy instruction via the operation panel 309 of a copying machine, the copying machine performs scan processing similar to the processing illustrated in FIG. 12. For example, a user sets a paper document on an automatic sheet feeder, and the copying machine automatically performs the scan to completely read the document and performs copy processing on the read document.

The UI control unit 910 receives a copy instruction via the panel controller 305 and sends job information to the job managing unit 903. The job managing unit 903 registers the job information to the job information management table. Then, similar to the step S1202, the job managing unit 903 instructs the scanner control unit 905 to start the scan processing. The scanner control unit 905 instructs the scanner controller 312 to start the scan processing. The scanner controller 312 controls the optical scanner apparatus 313 of the copying machine to read a paper document. Image data generated by reading document can be stored in the image storing unit 906. In this case, it is determined whether a generated image includes color data or only monochrome data.

The page information including color/monochrome information and the printing sheet size is stored into the image storing unit 906 and notified to the job managing unit 903. The job managing unit 903 searches a fee for one page with reference to the charged fee table illustrated in FIG. 11 and adds the obtained fee to the rasterized page fee 1005 of the job information management table illustrated in FIG. 10. When the scanning processing is entirely completed, the rasterized page fee becomes equal to the total charged fees of all pages.

Similar to the processing of step S1203, if the scanned page is a first page, the scanner control unit 905 instructs the printer control unit 907 to start the print processing. Then, the scanner control unit 905 determines whether a paper document to be scanned next exists, and continues the scan processing if there is the paper document remaining until all the documents are completely scanned.

Then, the copying machine performs the reservation processing and the print processing while the charging control server performs the print result add-up processing. The reservation processing, the print processing, and the print result add-up processing performed here are similar to those described above. Accordingly, the description thereof is not repeated here.

Second Exemplary Embodiment

In the first exemplary embodiment, a charging destination is a user. In a second exemplary embodiment, a charging destination is not limited to a user and can include a division or a group to which the user belongs.

FIG. 17 illustrates an exemplary charging destination table used by the balance managing unit 802 of the charging control server 104 that manages charging destination information.

In the table of FIG. 17, each row indicates the entry of charging destination including a charging destination 1651 and a user list 1652 that can designate the charging destination. The entry 1661 in the first row indicates that two users "User1" and "User2" can designate the sales division I.

The present exemplary embodiment can switch the charging destination from a user to a user group, such as a division or a group, to which the user belongs. Thus, the present exemplary embodiment can perform charging management for each user group. If a user belongs to a plurality of user groups, it is useful to select one of the user groups as the charging destination when the user instructs start of printing from the host computer or a copying machine.

Figure 18:
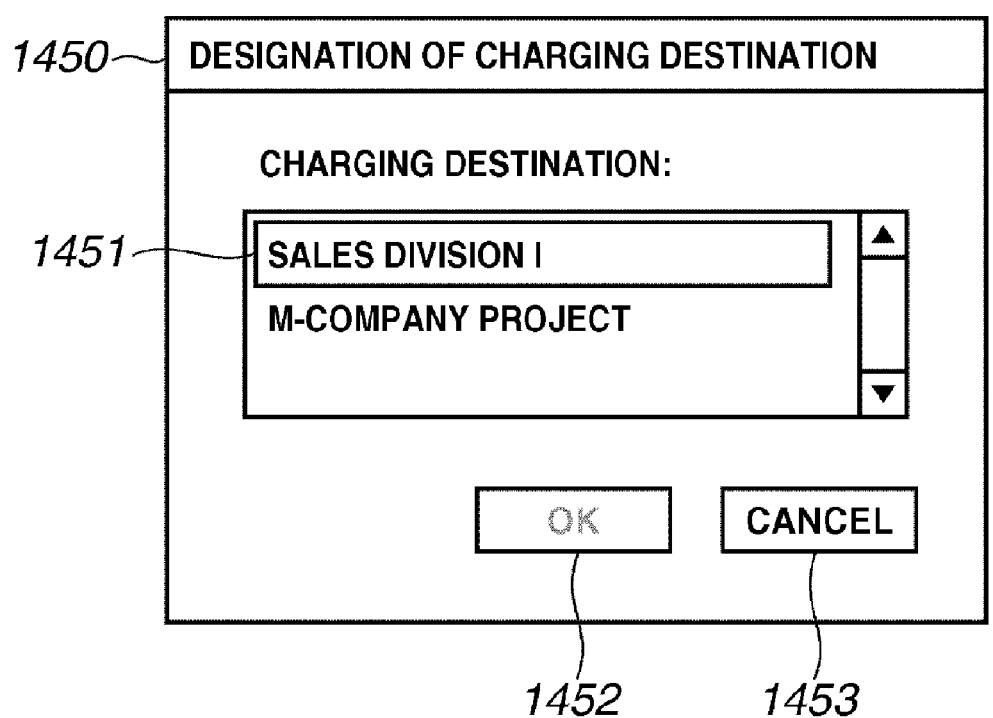
FIG. 18 illustrates an exemplary screen that enables a user to designate a charging destination according to the second exemplary embodiment of the present invention.

FIG. 18 illustrates an exemplary screen 1450 that enables a user to designate a charging destination. The screen of FIG. 18 can be displayed on the display module 210 of the host computer 101 or on the display module 310 of the copying machine A 102 or the copying machine B 103.

The screen 1450 illustrated in FIG. 18 includes a charging destination designation menu 1451 that displays a list of charging destinations that a user can designate. An OK button 1452 enables a user to determine the charging destination. A cancel button 1453 enables a user to cancel designation of the charging destination.

For example, according to the example illustrated in FIG. 17, the user "User1" belongs to two user groups (i.e., sales division I and M-company project). Thus, the user "User1" can designate a desired destination to be charged from two selectable designations on the screen illustrated in FIG. 18.

If a user belongs to a plurality of user groups, it is useful to set the priority to each destination so that a desirable destination can be automatically chosen.

When a user performs copying on a copying machine, the UI control unit 910 can display the screen of FIG. 18 on the operation panel 309 if the log-in request is successfully accepted or the copy instruction is accepted.

In this case, the printer driver 402 or the UI control unit 910 designates a user name authenticated by the charging control server 104 and requests obtaining a list of charging destinations that the user can designate. The charging control server 104 receives the request and searches destinations in the user list that includes the designated user name with reference to the charging destination table (FIG. 17) held in the balance managing unit 802. Then, the charging control server 104 returns a list of destinations to be charged.

The printer driver 402 or the UI control unit 910 displays a charging destination designation screen (FIG. 18) including a list of charging destinations that a user can designate. When a user selects a desirable charging destination and pushes the OK button 1452, the selected charging destination information and a user name can be set as the print job information.

Furthermore, if only one charging destination that a user can designate exists, it is useful to automatically set the charging destination without displaying the charging destination designation screen.

FIG. 19 illustrates an exemplary reservation management table used by the reservation managing unit 803 of the charging control server 104 that manages reservation information for each job.

In FIG. 19, each row indicates the entry of a print job including a job ID 1701, a user name 1702, a charging destination (i.e., destination to be charged) 1703, and a reservation fee 1704.

The entry 1711 in the first row indicates a print job including a job ID "01", a user ID "User1" of the job owner, a charging destination "sales division I", and a reservation fee of 120 yen. Similarly, the entry 1712 in the second row indicates a print job including a job ID "02", a user ID "User2", a charging destination "M-company project", and a reservation fee of 300 yen. The entry 1713 in the third row indicates a print job including a job ID "03", a user ID "User3", a charging destination "M-company project", and a reservation fee of 210 yen.

FIG. 20 illustrates an exemplary balance management table used by the balance managing unit 802 of the charging control server 104 that manages remaining deposit information for each charging destination.

In FIG. 20, each row indicates the entry of charging destination including a charging destination name 1551, a remaining deposit 1552 of the charging destination, and a reservation sum 1553 having been reserved for performing the charging processing of the charging destination.

The present exemplary embodiment performs charging control processing similar to the control processing of the first exemplary embodiment described with reference to the flow charts of FIGS. 12 through 16.

The present exemplary embodiment is different from the first exemplary embodiment in that the charging destination information can include any user group (e.g., division or the like) in addition to the job ID and the user name, when the above-described charging management information or the charging destination is designated and confirmed.

Furthermore, the present exemplary embodiment is different from the first exemplary embodiment in that the charging destination information indicating any user group can be used when the job completion or cancellation or the reservation request is notified.

Third Exemplary Embodiment

Exemplary processing according to a third exemplary embodiment of the present invention will now be described below with reference to the flow charts of FIGS. 21 and 22.

The above-described first exemplary embodiment temporarily stops the print processing if the formula (i) is not satisfied (No in step S1301 of FIG. 13) and executes the reservation processing in step S1305. However, the copying machine can perform the rasterization processing concurrently with the print processing. Accordingly, print data having been already rasterized and ready for reservation processing can still exist. In this case, before the print processing is temporarily stopped, the copying machine can make additional reservation of the fee required for printing the pages having been already rasterized at this moment to prevent the print processing from being frequently interrupted.

In the present exemplary embodiment, the print data rasterizing unit 904 sends one-page rasterization completion notification to the deposit limit managing unit 908 every time the rasterization processing for the print data of one page included in a print job is completed. The deposit limit managing unit 908 performs an additional reservation in response to the notification.

Figure 21:
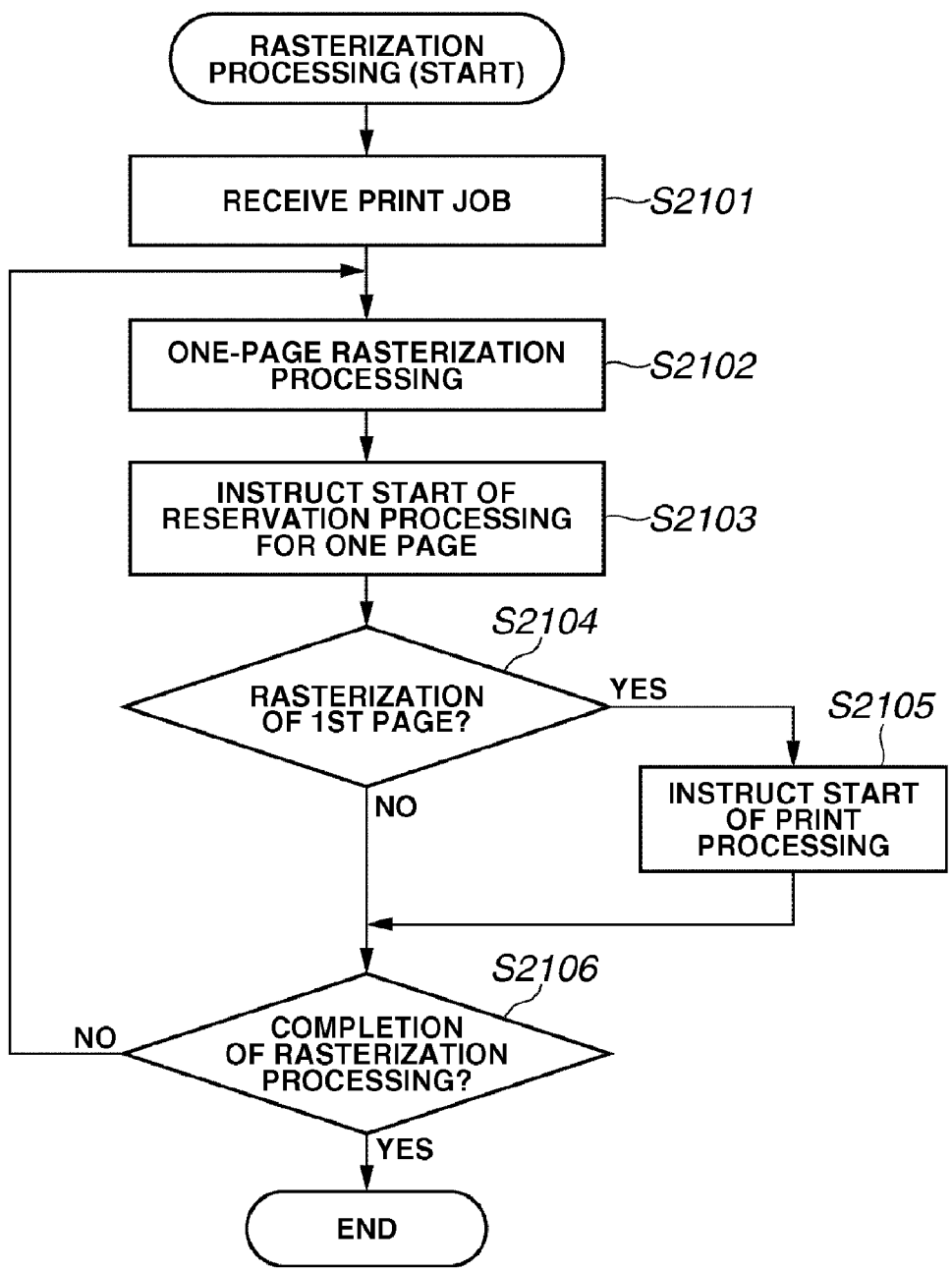
FIG. 21 is a flow chart illustrating print job reception and print job rasterization processing performed by the copying machine according to a third exemplary embodiment of the present invention.
Figure 22:
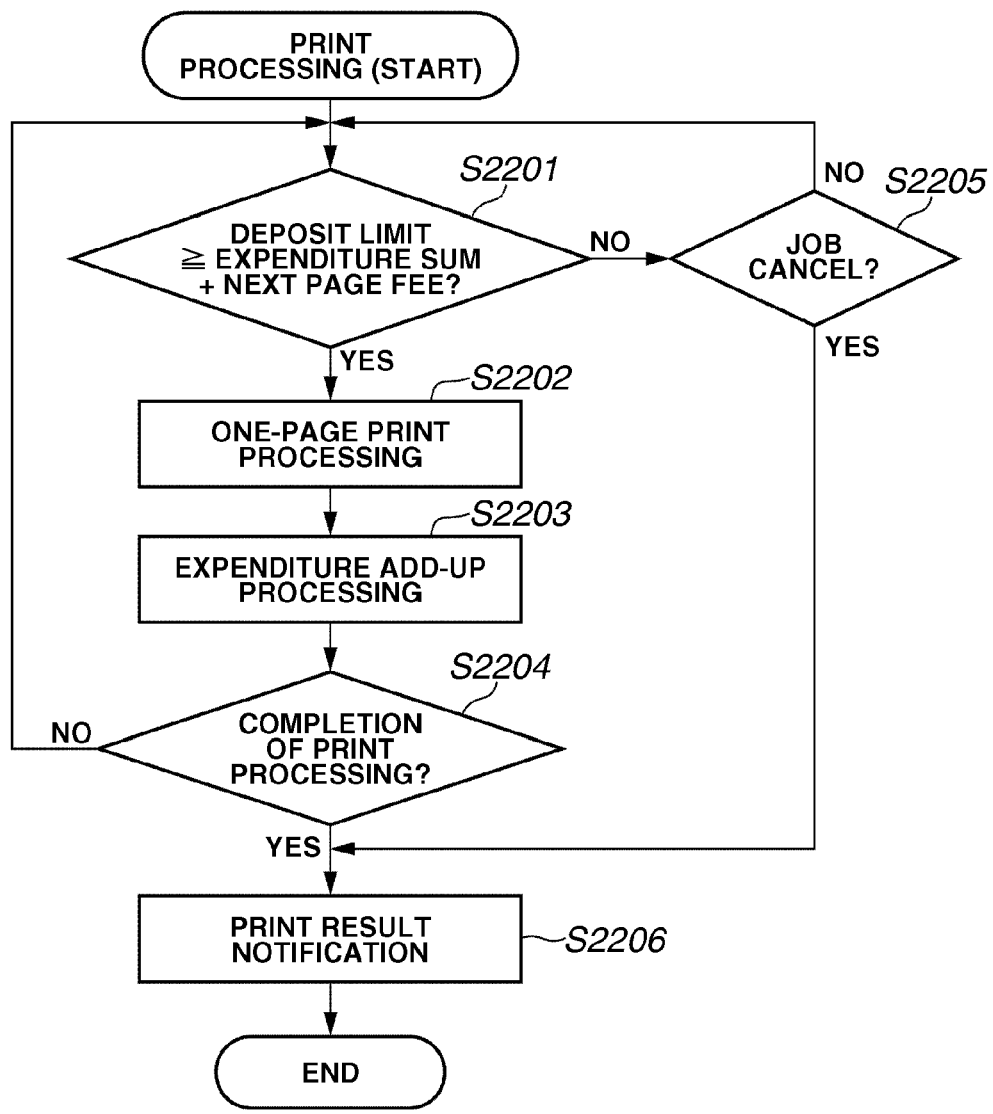
FIG. 22 is a flow chart illustrating print processing performed by the copying machine according to the third exemplary embodiment of the present invention.

FIGS. 21 and 22 are flow charts respectively illustrating exemplary print job rasterization processing and print processing performed by the copying machine. The programs for the processing illustrated in FIGS. 21 and 22 can be stored on a storage medium (e.g., RAM 303 or ROM 302) illustrated in FIG. 3 and can be executed by the CPU 301.

FIG. 21 is a flow chart illustrating exemplary print job reception and print job rasterization processing performed by the copying machine according to the third exemplary embodiment. The flow chart illustrated in FIG. 21 is different from the flow chart of FIG. 12 in that processing of step S2103 is newly added.

Referring to FIG. 21, in step S2101, the copying machine receives a print job. The interface unit 901 receives a print job transmitted from the host computer 101, and stores print data in the print data storing unit 902. Then, the interface unit 901 notifies the job managing unit 903 of information of the received print job. The job managing unit 903 registers the job information to the job information management table illustrated in FIG. 10. Then, the job managing unit 903 instructs the print data rasterizing unit 904 to start job rasterization processing.

In step S2102, the print data rasterizing unit 904 obtains the print data from the print data storing unit 902, performs image generation processing according to print settings of the print job to generate image data and stores the image data of each page into the image storing unit 906.

At this time, the print data rasterizing unit 904 determines whether the rasterized image includes color data or includes monochrome data only. The print data rasterizing unit 904 stores page information including color/monochrome information and the printing sheet size into the image storing unit 906, and notifies the page information to the job managing unit 903.

The job managing unit 903 searches a fee for one page with reference to the charged fee table illustrated in FIG. 11, and adds the obtained fee to the rasterized page fee 1005 of the job information management table illustrated in FIG. 10. For example, when the rasterization processing for a print job is entirely completed, the rasterized page fee becomes equal to the total charged fees of all pages included in the print job.

In step S2103, the print data rasterizing unit 904 instructs the deposit limit managing unit 908 to start the reservation processing illustrated in FIG. 14 for the print data of one page having been rasterized.

In step S2104, the print data rasterizing unit 904 determines whether the page having been rasterized in step S2102 is a first page of the print job. At this time, the print data rasterizing unit 904 has already identified the page number of each rasterized page of the received print job. If the print data rasterizing unit 904 determines that the rasterized page is the first page (Yes in step S2104), the processing flow proceeds to step S2105. On the other hand, if the rasterized page is other than the first page (No in step S2104), the processing flow proceeds to step S2106.

In step S2105, the print data rasterizing unit 904 instructs the printer control unit 907 to start later-described print processing illustrated in FIG. 22. Then, the processing flow proceeds to step S2106 to repeat the rasterization processing if the rasterization processing on the print job has not been completed.

In step S2106, the print data rasterizing unit 904 determines whether the rasterization processing has been completely performed for all the pages. If the print data rasterizing unit 904 determines that the print job has a next page to be rasterized (No in step S2106), the processing flow returns to step S2102. In step S2102, the print data rasterizing unit 904 continues the rasterization processing for the next page. On the other hand, if the print data rasterizing unit 904 determines that the print job has no page to be rasterized next (Yes in step S2106), the print data rasterizing unit 904 determines that the rasterization processing for the print job received in step S2101 has been completed. Thus, the print data rasterizing unit 904 terminates the processing of this routine.

Through the processing of step S2105, the copying machine can start print processing while continuing the rasterization processing. In other words, the copying machine can concurrently execute the rasterization processing and the later-described print processing. In addition, through the processing of step S2103, the copying machine can start reservation processing for one page upon completing the rasterization processing for this page. In other words, the copying machine can concurrently execute the rasterization processing, the reservation processing, and the print processing after one page of a print job has been rasterized.

FIG. 22 is a flow chart illustrating print processing performed by the copying machine according to the third exemplary embodiment. The flow chart illustrated in FIG. 22 does not include the reservation processing in step S1305 described in the flow chart of FIG. 13.

Referring to FIG. 22, in step S2201, before starting the printing of a page, the printer control unit 907 compares an expenditure sum in a print job of a next page with the deposit limit set for the print job. The printer control unit 907 obtains information (e.g., color/monochrome, printing sheet size, etc) about the next page from the image storing unit 906, and searches a fee for the next page with reference to the charge table of the job managing unit 903. Furthermore, the printer control unit 907 obtains a deposit limit and an expenditure sum of the print job received in step S2101 of FIG. 21, with reference to the job information management table.

$$\text{Deposit limit} \geq \text{expenditure sum} + \text{next page fee} \qquad (i)$$

If the printer control unit 907 determines that the above-described formula (i) is satisfied (Yes in step S2201), the processing flow proceeds to step S2202. On the other hand, if the formula (i) is not satisfied (No in step S2201), the processing flow proceeds to step S2205.

In step S2202, the printer control unit 907 sends a print instruction signal to the printer engine 909. After receiving the instruction signal, the printer engine 909 notifies the printer control unit 907 of a print-ready state. Then, the printer control unit 907 sends image data of one page having been rasterized to the printer engine 909 to cause the printer engine 909 to perform printing according to print data.

In step S2203, the printer control unit 907 notifies the job managing unit 903 of expenditure for the completed printing of one page. The job managing unit 903 adds the printing fee for the received page to the expenditure sum 1004 in the job information management table.

In step S2204, the printer control unit 907 determines whether the printing of the print job received in step S2101 of FIG. 21 has been thoroughly completed. If the printer control unit 907 determines that the print job received in step S2101 of FIG. 21 includes a next page to be printed (No in step S2204), the processing flow returns to step S2201 to continue the print processing. On the other hand, if the printing of the entire job has been completed (Yes in step S2204), the printer control unit 907 notifies the job managing unit 903 about completion of the printing of the received print job. The processing flow proceeds to step S2206.

In step S2205, the printer control unit 907 determines whether print job cancellation is instructed to the job managing unit 903 during the reservation processing of step S2103 illustrated in FIG. 21. If the printer control unit 907 determines that the job cancellation is instructed (Yes in step S2205), the processing flow proceeds to step S2206. On the other hand, if the job cancellation is not instructed (No in step S2205), the printer control unit 907 determines that the reservation processing (i.e., fee charging reservation for the printing of print data of one printable page) has been accepted. The processing flow proceeds to step S2201 to perform the printing.

In step S2206, when the job managing unit 903 receives the print completion notification of the print job, the job managing unit 903 notifies the deposit limit managing unit 908 of job completion together with the expenditure required for the printing of the print job. Furthermore, if print job cancellation is notified during the reservation processing, the job managing unit 903 notifies the deposit limit managing unit 908 of any expenditure for the interrupted printing of the print job.

Then, the job managing unit 903 writes a log indicating information of the completed print job into the HD or other storage medium, and deletes the job information. Then, the deposit limit managing unit 908 notifies the charging control server 104 of the expenditure notified from the job managing unit 903, for example, together with the job ID of the print job and the user ID of the job owner. The job managing unit 903 can use the above-described log for comparing or confirming the relationship between a print result having been charged and actual processing information.

FIG. 30 is an exemplary timing chart of rasterization processing, reservation processing, and print processing which can be performed concurrently according to the present exemplary embodiment. According to the timing chart of FIG. 30, an input job includes a total of eight pages to which the rasterization processing, the reservation processing, and the print processing are applied.

Referring to FIG. 30, at timing 3001, the interface unit 901 inputs a print job. The print data rasterizing unit 904 starts rasterization processing.

At timing 3002, the print data rasterizing unit 904 completes the rasterization processing for a first page. In steps S2103 and S2105 of FIG. 21, the print data rasterizing unit 904 instructs the deposit limit managing unit 908 and the printer control unit 907 to start reservation processing and print processing. In the present exemplary embodiment, if the received print job includes a page to be next rasterized, the rasterization processing is concurrently executed with the reservation processing and the print processing.

The page having been rasterized at the timing 3002 is only the first page. Thus, the deposit limit managing unit 908 requests the charging control server 104 to reserve only the fee for the first page. The printer control unit 907 can start printing of only the first page.

At timing 3003, the printer control unit 907 completes the print processing for the first page. At this moment, the print data rasterizing unit 904 has already completed the rasterization processing for the first to fourth pages.

According to the present exemplary embodiment, every time the rasterization processing for one page of the print job is completed, the charging control server 104 immediately reserves the rasterized page. Therefore, at the timing 3003, the reservation processing for the first to third pages is already completed. Then, the printer control unit 907 starts the reservation processing for the fourth page.

At timing 3004, the print data rasterizing unit 904 completes the rasterization processing for all pages of the print job. At this moment, the deposit limit managing unit 908 requests the charging control server 104 to reserve the fee for the last page (i.e., the eighth page).

At timing 3005, the printer control unit 907 completes the print processing for the first to eighth pages.

As described above, the present exemplary embodiment can concurrently execute the rasterization processing, the reservation processing, and the print processing. Accordingly, similar to the first exemplary embodiment, the present exemplary embodiment can improve the processing speed for printing a first page and can reduce the processing time required for completing the printing of a print job requested by a user.

Fourth Exemplary Embodiment

Now, a fourth exemplary embodiment of the present invention will be described below. According to the first to third exemplary embodiments, if the shortage in the remaining deposit is notified during the printing of a print job, the print processing may be canceled or delayed. However, depending on the type of document or the situation of user, it may not be useful to cancel or suspend the print processing. In this regard, it may be useful to start the printing of all pages of one job only when the remaining deposit is sufficient for completing the printing of all pages.

The present exemplary embodiment adds a "print mode" field, as print job information, to the job information management table illustrated in FIG. 10. A user can select either a "pre-print confirmation mode" or a "processing speed priority mode" as the print mode.

When the "pre-print confirmation mode" is selected, the copying machine performs reservation processing for all pages after the rasterization processing of a print job is entirely accomplished. Then, the copying machine starts print processing of the job.

When the "processing speed priority mode" is selected, the copying machine partially performs reservation processing for any page(s) having been already rasterized as described in the first to third exemplary embodiments. Then, the copying machine starts printing the rasterized page(s).

In the present exemplary embodiment, the "processing speed priority mode" is similar to the print mode performing the processing described in the first exemplary embodiment. As an exemplary method for designating the print mode to be described below, the copying machine can automatically select the print mode according to the remaining deposit of each user. Alternatively, a user may be allowed to designate a preferable print mode by manual selection.

Furthermore, the charging control server performs reservation processing and print result add-up processing which are similar to those described in the first exemplary embodiment.

When the "pre-print confirmation mode" is set, the copying machine performs the following print job rasterization processing, reservation processing, and print processing, which are described below with reference to the flow charts of FIGS. 23 through 25. The programs for the processing illustrated in FIGS. 23 through 25 can be stored on a storage medium (e.g., RAM 303 or ROM 302) illustrated in FIG. 3 and can be executed by the CPU 301.

Figure 23:
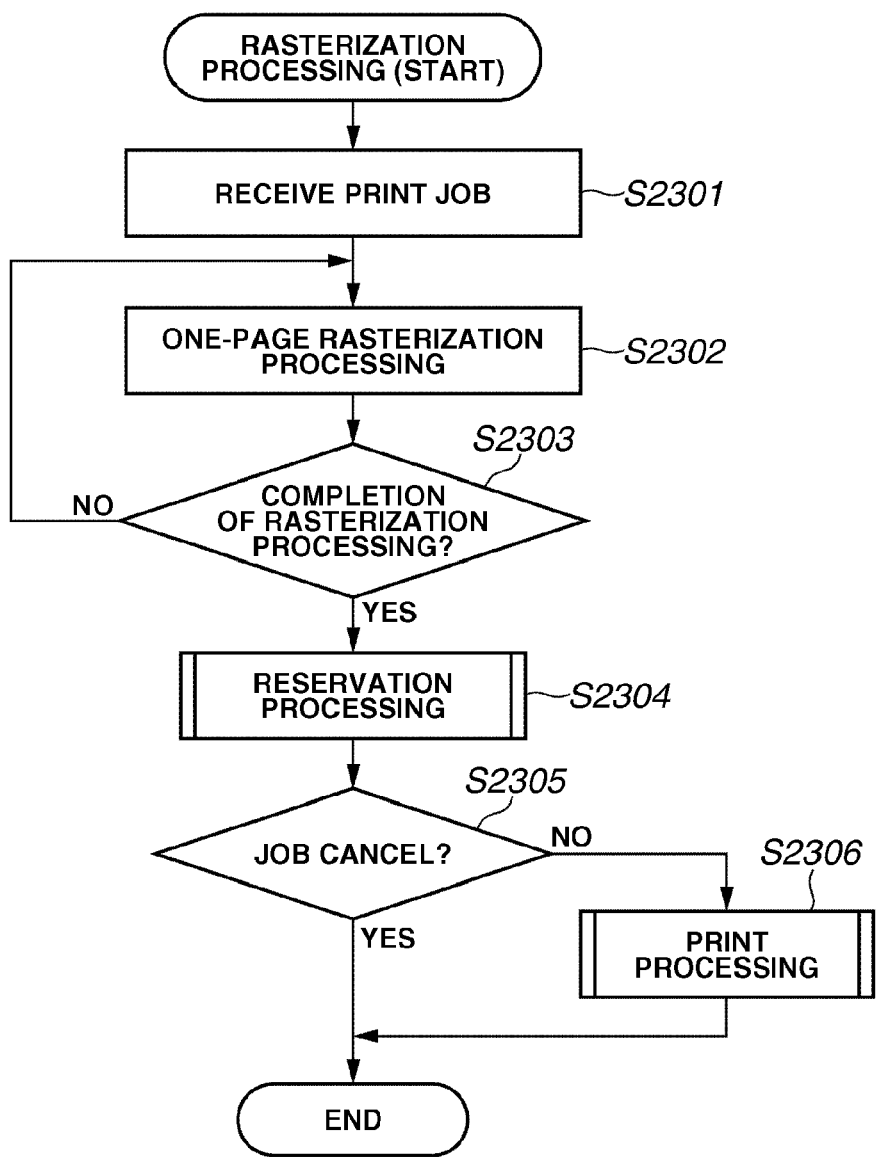
FIG. 23 is a flow chart illustrating print job reception and print job rasterization processing performed by the copying machine, in a pre-print confirmation mode, according to a fourth exemplary embodiment of the present invention.

FIG. 23 is a flow chart illustrating exemplary print job reception and print job rasterization processing performed by the copying machine, in the pre-print confirmation mode, according to the fourth exemplary embodiment. The processing illustrated in FIG. 23 is different from the rasterization processing according to the first to third exemplary embodiments in that the copying machine performs reservation processing after completing the print job rasterization processing.

Referring to FIG. 23, in step S2301, the copying machine receives a print job. The interface unit 901 receives the print job transmitted from the host computer 101, and stores print data in the print data storing unit 902. Then, the interface unit 901 notifies the job managing unit 903 of information of the received print job. The job managing unit 903 registers the job information to the job information management table illustrated in FIG. 10. Then, the job managing unit 903 instructs the print data rasterizing unit 904 to start job rasterization processing.

In step S2302, the print data rasterizing unit 904 obtains the print data from the print data storing unit 902, performs image generation processing according to print settings of the print job to generate image data and stores the image data of each page into the image storing unit 906.

At this time, the print data rasterizing unit 904 determines whether the rasterized image includes color data or includes monochrome data only. The print data rasterizing unit 904 stores page information including color/monochrome information and the printing sheet size into the image storing unit 906, and notifies the page information to the job managing unit 903.

The job managing unit 903 searches a fee for one page with reference to the charged fee table illustrated in FIG. 11, and adds the obtained fee to the rasterized page fee 1005 of the job information management table illustrated in FIG. 10. For example, when the rasterization processing for a print job is entirely completed, the rasterized page fee becomes equal to the total charged fees of all pages included in the print job.

In step S2303, the print data rasterizing unit 904 determines whether the rasterization processing has been completely performed for all the pages. If the print data rasterizing unit 904 determines that the print job has a next page to be rasterized (No in step S2303), the processing flow returns to step S2302. In step S2302, the print data rasterizing unit 904 continues the rasterization processing for the next page. On the other hand, if the print data rasterizing unit 904 determines that the print job has no page to be rasterized (Yes in step S2303), the print data rasterizing unit 904 determines that the rasterization processing for the print job received in step S2301 has been completed. Thus, the processing flow proceeds to step S2304.

In step S2304, the print data rasterizing unit 904 instructs the deposit limit managing unit 908 to perform reservation processing for the print job having been completely rasterized.

Figure 24:
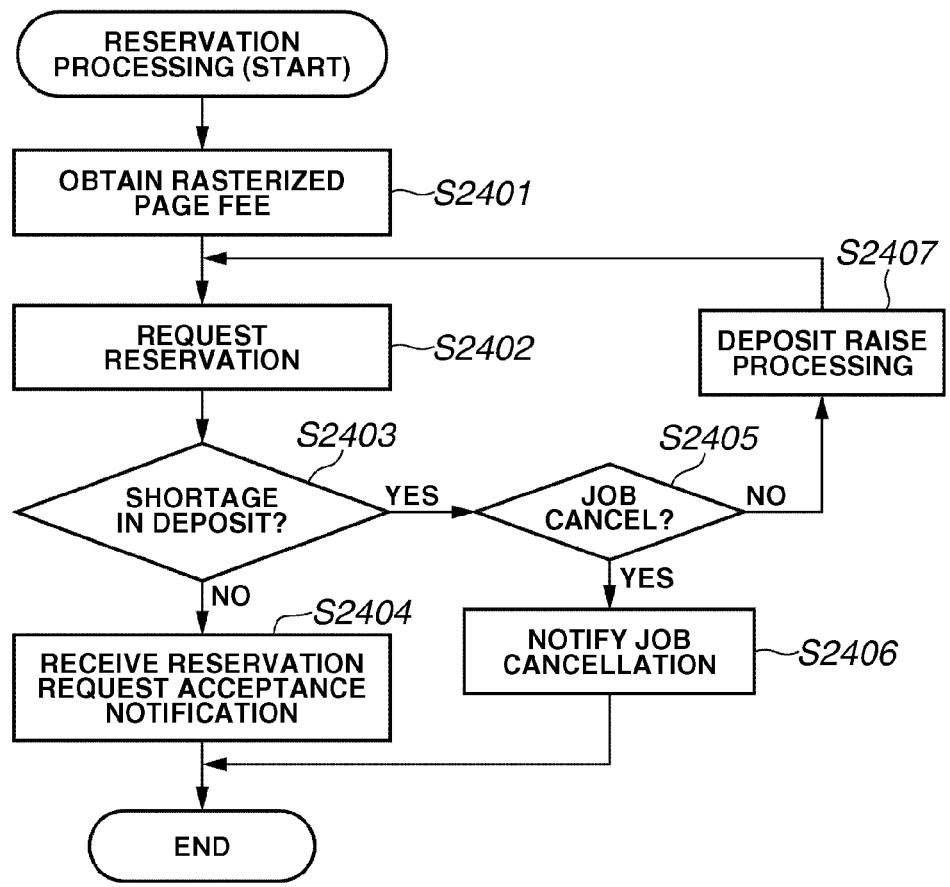
FIG. 24 is a flow chart illustrating reservation processing performed by the copying machine, in the pre-print confirmation mode, according to the fourth exemplary embodiment of the present invention.

In step S2305, the print data rasterizing unit 904 determines whether print job cancellation is instructed to the job managing unit 903 during the reservation processing illustrated in FIG. 24. If the print data rasterizing unit 904 determines that print job cancellation is instructed (Yes in step S2305), the print data rasterizing unit 904 terminates the processing of this routine without performing print processing. On the other hand, if the print data rasterizing unit 904 determines that job cancellation is not instructed (No in step S2305), the print data rasterizing unit 904 determines that charging reservation of the fee for printing is accepted. The processing flow proceeds to step S2306 to perform printing. More specifically, according to the processing in the pre-print confirmation mode, the copying machine can complete the entire processing of a print job by canceling the print job in the later-described reservation processing, or by terminating the print processing after the reservation request is accepted.

FIG. 24 is a flow chart illustrating exemplary reservation processing performed by the copying machine, in the pre-print confirmation mode, to request the charging control server 104 to make reservation for a printing fee.

In the present exemplary embodiment, the print job rasterization processing is already completed in the rasterization processing illustrated in FIG. 23. Therefore, the processing illustrated in FIG. 24 is different from the reservation processing according to the first to third exemplary embodiments in that the copying machine completes the reservation processing upon receiving of the reservation completion notification.

Referring to FIG. 24, in step S2401, the deposit limit managing unit 908 obtains a rasterized page fee for a print job from the job managing unit 903. The amount of fee obtained in step S2401 is equivalent to the total fee to be charged for entirely printing the print job.

In step S2402, the deposit limit managing unit 908 transmits reservation information (e.g., reservation request fee, job ID, and user ID of the job owner) to the charging control server 104 and requests reservation of the charged fee. Here, the deposit limit managing unit 908 regards the reservation request fee as the rasterized page fee and requests charging reservation for the fee to be charged for entirely printing the print job.

In step S2403, the deposit limit managing unit 908 determines whether a deposit shortage notification is received from the charging control server 104. If the deposit limit managing unit 908 determines that the deposit shortage notification is not received (No in step S2403), the processing flow proceeds to step S2404. On the other hand, if the deposit shortage notification is received (Yes in step S2403), the processing flow proceeds to step S2405.

In step S2404, the deposit limit managing unit 908 receives a reservation request acceptance notification from the charging control server 104 and terminates the reservation processing.

If the deposit limit managing unit 908 receives any deposit shortage notification (Yes in step S2403), the copy machine displays, on the display module 310, a message indicating the shortage in deposit and also displays a screen enabling a user to cancel the print job or raise the deposit.

If the deposit limit managing unit 908 determines that user's instruction is job cancellation (Yes in step S2405), the processing flow proceeds to step S2406. If user's instruction is not job cancellation (No in step S2405), the processing flow proceeds to step S2407. In the present exemplary embodiment, a user can instruct, via the operation panel 309, canceling of the print job or raising of the deposit.

In step S2406, when the user instructs cancellation of the print job, the deposit limit managing unit 908 instructs cancellation of the print job to the job managing unit 903. The job managing unit 903 instructs the interface unit 901, the print data rasterizing unit 904, and the printer control unit 907 to cancel the print job. The interface unit 901, the print data rasterizing unit 904, and the printer control unit 907 respectively stop the print job processing and discard the print job data and the image data to cancel the print job.

In step S2407, the deposit limit managing unit 908 confirms user's deposit raise instruction by inquiring the charging control server 104 whether predetermined deposit raise processing has been performed by the user. In the present exemplary embodiment, as exemplary deposit raise processing, a user can remit the amount of money to be increased to the charging control server 104 via a client PC to complete the deposit raise.

However, the deposit raising method is not limited to the exemplary method described in the present exemplary embodiment. When the deposit limit managing unit 908 confirms completion of the deposit raise processing performed by a user, the processing flow returns to step S2402 to repeat the reservation request processing.

Figure 25:
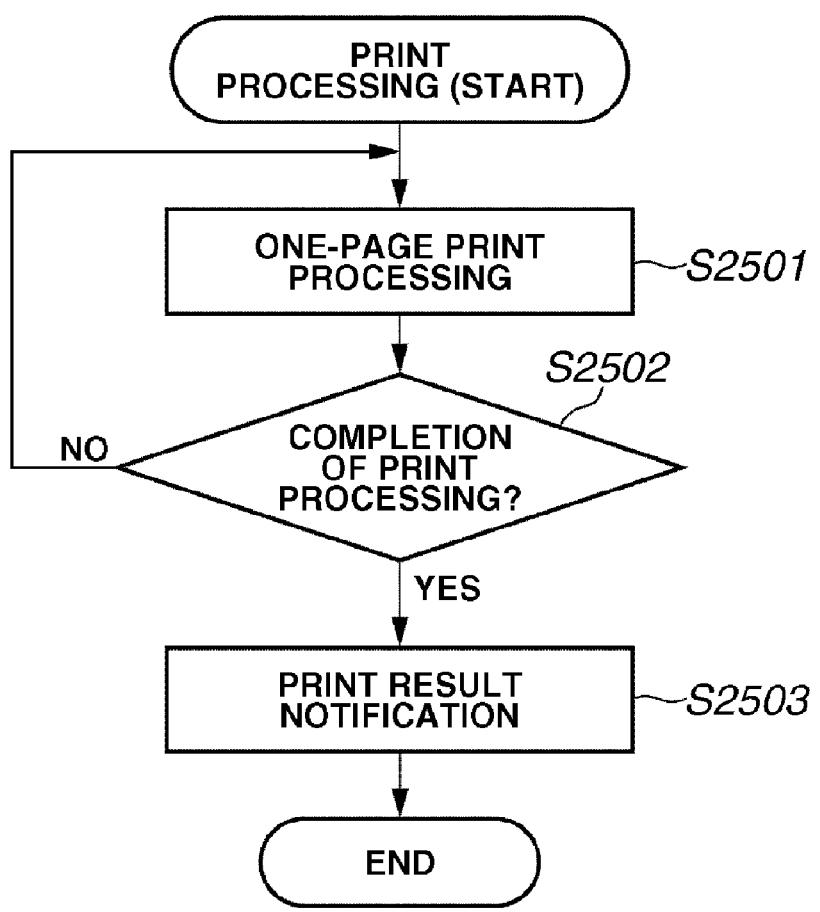
FIG. 25 is a flow chart illustrating print processing performed by the copying machine, in the pre-print confirmation mode, according to the fourth exemplary embodiment of the present invention.

FIG. 25 is a flow chart illustrating exemplary print processing performed by the copying machine, in the pre-print confirmation mode.

Referring to FIG. 25, in step S2501, the printer control unit 907 sends a print instruction signal to the printer engine 909. After receiving the instruction signal, the printer engine 909 notifies the printer control unit 907 of a print-ready state. Then, the printer control unit 907 sends image data of one page having been rasterized to the printer engine 909 to cause the printer engine 909 to perform printing according to print data.

In step S2502, the printer control unit 907 determines whether the printing of the received print job has been thoroughly completed. If the printer control unit 907 determines that the received print job includes a next page to be printed (No in step S2502), the processing flow returns to step S2501 to continue the print processing. On the other hand, if the printing of the entire job has been completed (Yes in step S2502), the printer control unit 907 notifies the job managing unit 903 of completion of the printing of the received print job. The processing flow proceeds to step S2503.

In step S2503, when the job managing unit 903 receives the print completion notification of the print job, the job managing unit 903 notifies the deposit limit managing unit 908 of job completion together with the expenditure required for the printing of the print job.

Then, the job managing unit 903 writes a log indicating information of the completed print job into the HD or other storage medium, and deletes the job information. Then, the deposit limit managing unit 908 notifies the charging control server 104 of the expenditure notified from the job managing unit 903, for example, together with the job ID of the print job and the user ID of the job owner. The job managing unit 903 can use the above-described log for comparing or confirming the relationship between a print result having been charged and actual processing information. Then, the above-described print processing ends.

Now, an exemplary method for designating the print mode will be described below. The programs for the processing illustrated in FIGS. 26 and 27 can be stored on a storage medium (e.g., RAM 303 or ROM 302) illustrated in FIG. 3 and can be executed by the CPU 301.

Figure 26:
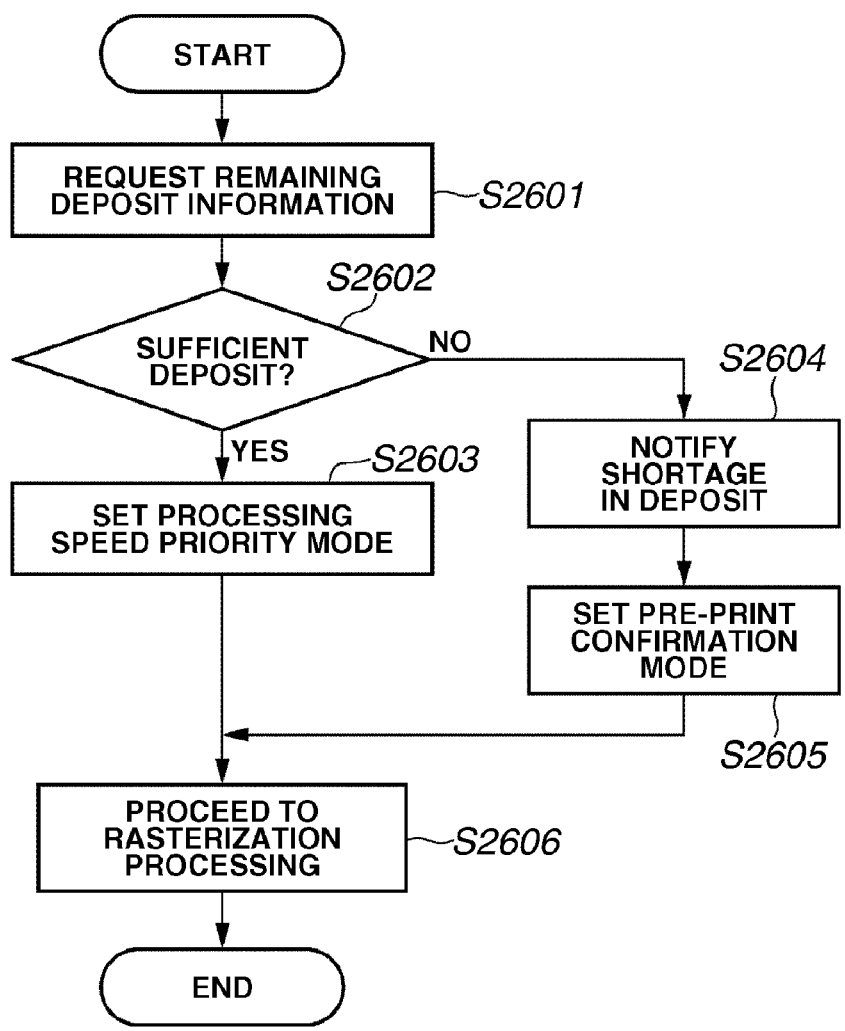
FIG. 26 is a flow chart illustrating processing for automatically selecting a print mode according to a remaining deposit of each user according to the fourth exemplary embodiment of the present invention.

The copying machine performs the processing illustrated in FIG. 26 immediately before starting the rasterization processing for a print job which may be received from the host computer. At this time, the UI control unit 910 inquires the charging control server 104 about the usable remaining deposit of a user (i.e., the balance between the remaining deposit and the reservation sum) and obtains the information. Then, if the obtained information (i.e., remaining deposit of a user) is less than a specific amount of money designated beforehand by an administrator, the copying machine operates in the "pre-print confirmation mode" to perform printing of the print job.

If the host computer generates a print instruction, the printer driver 402 can inquire the charging control server 104 about the remaining deposit of a user.

More specifically, the processing illustrated in FIG. 26 can be performed as interrupt processing when a print job is received in the flow chart of FIG. 12, FIG. 21, or FIG. 23.

Details of the flow chart illustrated in FIG. 26 will now be described below.

Referring to FIG. 26, in step S2601, when a copying machine receives a print job, the UI control unit 910 requests the charging control server 104 to transmit information relating to user's available deposit (i.e., the balance between the deposit assigned to the user and the reservation sum). After receiving the request, the balance managing unit 802 of the charging control server 104 notifies remaining deposit information to the copying machine. The UI control unit 910 obtains the remaining deposit according to the notification.

In step S2602, the UI control unit 910 compares the obtained remaining deposit with a specific amount of money which is previously set by a user and stored on the RAM or other storage medium. If the UI control unit 910 determines that the remaining deposit is not less than the designated specific amount of money (Yes in step S2602), the UI control unit 910 determines that the remaining deposit is sufficient for performing requested printing. The processing flow proceeds to step S2603. On the other hand, if the UI control unit 910 determines that the remaining deposit is less than the designated specific amount of money (No in step S2602), the UI control unit 910 determines that the remaining deposit is insufficient. The processing flow proceeds to step S2604.

In step S2603, the job managing unit 903 sets a print mode of the print job to the "processing speed priority mode", according to the processing result of step S2604 performed by the UI control unit 910.

In step S2604, the UI control unit 910 notifies a user, via the display module 310, of the shortage in deposit and of shifting to the "pre-print confirmation mode".

In step S2605, the job managing unit 903 sets the print mode of the print job to the "pre-print confirmation mode", according to the processing result of steps S2602 and S2604 performed by the UI control unit 910.

In step S2606, the processing flow proceeds to the rasterization processing for the received print job and the print mode switching processing of this routine is terminated.

According to the above-described processing, if the remaining deposit is not less than an amount of money designated beforehand by a user, the "processing speed priority mode" is selected. On the other hand, if the remaining deposit is less than the designated amount of money, the "pre-print confirmation mode" is selected. More specifically, the copying machine gives priority to the processing speed if a sufficient amount of deposit remains in the charging control server, and can prevent the print processing from being interrupted by predicting whether there will be the shortage in deposit.

Figure 27:
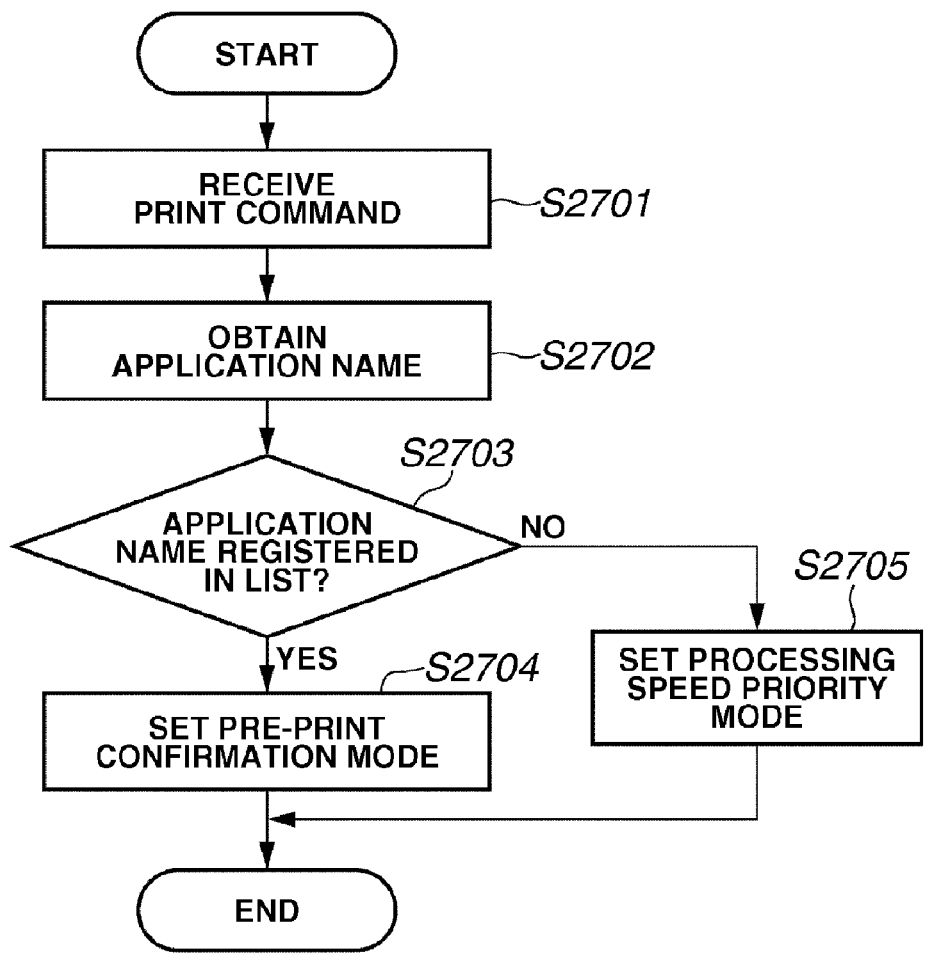
FIG. 27 is a flow chart illustrating processing for automatically selecting a print mode based on a print application according to the fourth exemplary embodiment of the present invention.

FIG. 27 is a flow chart illustrating exemplary processing for automatically changing the print mode according to the type of print application previously set for each user. The printer driver 402 performs the processing of FIG. 27 in response to a print instruction by a user.

Before describing the detailed processing of the flow chart of FIG. 27, it is assumed that, when the host computer 101 instructs printing, the printer driver 402 enables a user to register a print application name into a list if this print application sets the "pre-print confirmation mode" as print job information. The list can be stored on the RAM or HD, so that the printer driver 402 can refer to the list.

Referring to FIG. 27, in step S2701, the printer driver 402 receives a printing command from the print application 401.

In step S2702, the printer driver 402 obtains the name of the print application 401 that has issued the printing command.

In step S2703, the printer driver 402 determines whether the obtained print application name is registered in the list. If the printer driver 402 determines that the print application name is registered in the list (Yes in step S2703), the processing flow proceeds to step S2704. On the other hand, if the printer driver 402 determines that the print application name is not registered in the list (No in S2703), the processing flow proceeds to step S2705.

In step S2704, the printer driver 402 sets the "pre-print confirmation mode" to print mode included in the job information.

In step S2705, the printer driver 402 sets the "processing speed priority mode" to print mode included in the job information.

For example, the print processing may be limited to only one time according to the type of business application. In such a case, it is not useful to interrupt the print processing due to the shortage in deposit. Thus, it is useful to switch the print mode according to the print application.

The host computer 101 can display a print mode selection screen that enables a user to select the "pre-print confirmation mode" or the "processing speed priority mode" for property settings of the printer driver 402. Alternatively, the printer driver 402 can use a pop-up display of the print mode selection screen for a user when the host computer 101 instructs start of printing.

Furthermore, when the copying machine performs copying, the UI control unit 910 causes the operation panel 309 to display a print mode selection screen when the log-in request is successfully accepted or the copy instruction is accepted.

Figure 28:
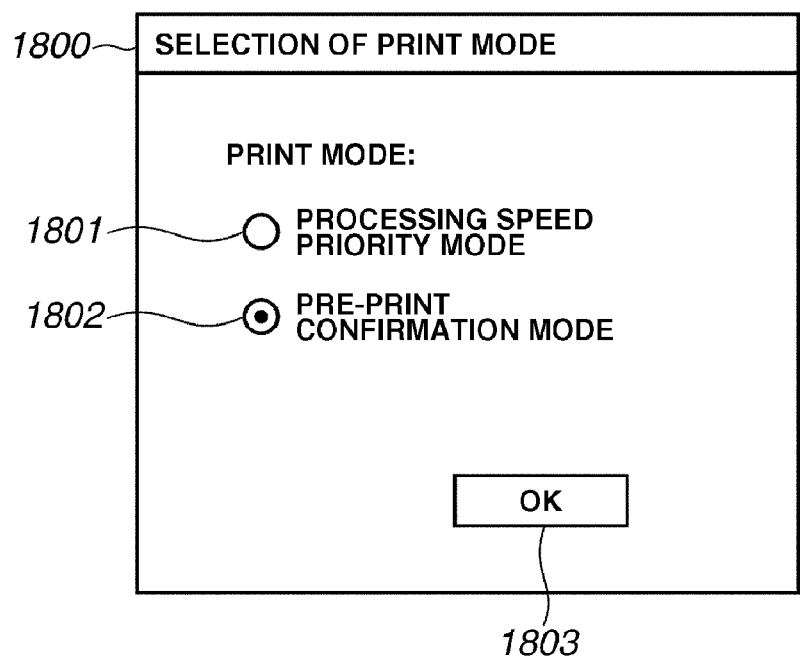
FIG. 28 illustrates a selection screen that enables a user to manually select a print mode according to the fourth exemplary embodiment of the present invention.

FIG. 28 illustrates an exemplary print mode selection screen 1800 according to the present exemplary embodiment.

The print mode selection screen 1800 includes a radio button 1801 that enables a user to select the "processing speed priority mode", a radio button 1802 that enables a user to select the "pre-print confirmation mode", and an OK button 1803 that enables a user to fix the selected print mode.

The printer driver 402 or the UI control unit 910 can display the print mode selection screen 1800 and, when a user selects a desired print mode and pushes the OK button 1803, set the selected print mode and the user ID as print job information.

The operation for switching the print mode is not limited to the above-described method.

For example, it is useful to automatically select the print mode according to the number of prints (copies). More specifically, a user of the host computer 101 sets the number of prints (copies) as print settings of the printer driver 402. At this time, the printer driver 402 sets the "pre-print confirmation mode" as print job mode if the number of prints (copies) is not less than a designated threshold and sets the "processing speed priority mode" if less than a previously designated threshold.

When the number of prints is large, the printing time for a large number of prints (copies) becomes long and thus a user may be temporarily absent from the copying machine during the print processing. In this case, when the user returns to the copying machine, the copying machine may have stopped the printing due to the shortage in deposit, and thus a user may be delayed in knowing the situation. In order to address this problem, it is useful to previously confirm a total amount of money required for printing all the pages and start the print processing after a sufficient amount of deposit is reserved.

FIG. 31 is a timing chart illustrating rasterization processing, reservation processing, and print processing, in a case where the "processing speed priority mode" and the "pre-print confirmation mode" can be set. The timing chart according to the "processing speed priority mode" is similar to the timing chart of the first exemplary embodiment illustrated in FIG. 29.

An upper half of FIG. 31 is the timing chart for the "processing speed priority mode" and a lower half is the timing chart for the "pre-print confirmation mode". According to the exemplary timing chart illustrated in FIG. 31, an input print job includes a total of eight pages to which the rasterization processing, the reservation processing, and the print processing are successively applied.

When a job is input, the print data rasterizing unit 904 starts the rasterization processing.

Referring to FIG. 31, at timing 3101, the print data rasterizing unit 904 completes the rasterization processing for a first page.

According to the "processing speed priority mode", the deposit limit managing unit 908 starts reservation processing immediately after the timing 3101. When the print data rasterizing unit 904 completes the reservation processing for the first page, the printer control unit 907 starts print processing for the first page. The rasterization processing for second and subsequent pages can be concurrently performed during the reservation processing and the print processing of the first page. The page having been rasterized at the timing 3101 is only the first page. Thus, the charging control server 104 can reserve only the fee for the first page. The printer control unit 907 can start printing of only the first page.

According to the "pre-print confirmation mode", the print processing and the reservation processing do not start before the rasterization processing for all pages is thoroughly completed. Thus, at the timing 3101, the print data rasterizing unit 904 continuously performs the rasterization processing.

At timing 3102, according to the "processing speed priority mode", the printer control unit 907 completes the print processing for the first page. The printer control unit 907 temporarily stops the print processing before starting the printing of a second page. At this moment, the print data rasterizing unit 904 has already completed the rasterization processing for the first to fourth pages. Thus, the printer control unit 907 can resume the print processing for the second to fourth pages if the charging control server 104 completes reservation of the fees for the second to fourth pages according to a request from the deposit limit managing unit 908.

At timing 3103, the print data rasterizing unit 904 completes the rasterization processing for all the pages. According to the "pre-print confirmation mode", both the reservation processing and the print processing are successively started after the rasterization processing for all pages is completed.

At timing 3104, according to the "processing speed priority mode", the printer control unit 907 completes the print processing for the first to fourth pages and starts reservation processing for fifth and subsequent pages. As the reservation processing for the first to fourth pages has been already completed at the timing 3102, it is required to additionally perform reservation processing for the fifth to eighth pages before starting the printing of the fifth to eighth pages. At this moment, the rasterization processing for all pages included in the print job has been already completed. Thus, the printer control unit 907 can resume the print processing for the fifth to eighth pages if the charging control server 104 completes reservation of the fees for the fifth to eighth pages according to a request from the deposit limit managing unit 908.

At timing 3105, according to the "processing speed priority mode", the printer control unit 907 completes the print processing for all pages.

At timing 3106, according to the "pre-print confirmation mode", the printer control unit 907 completes the print processing for all pages.

As apparent from FIG. 31, the "processing speed priority mode" can reduce the time required for completing the printing of the first page included in the print job.

However, according to the "processing speed priority mode", the job may be interrupted due to the shortage in deposit at the timing 3102 or 3104. On the other hand, according to the "pre-print confirmation mode", the printing fee for all pages is previously reserved in the charging control server 104 and the shortage in deposit does not occur before the timing 3103.

As described above, the present exemplary embodiment enables a user to select the "processing speed priority mode" for giving priority to the print processing speed or the "pre-print confirmation mode" for preventing any interruption in the print processing, according to the type of printing object or print application.

Note that the present invention can be implemented by directly or remotely supplying a program of software implementing functions of the above-described exemplary embodiments (in the exemplary embodiments, the program corresponding to the processing performed according to the flow charts in the drawings) to a system or an apparatus and reading and executing supplied program codes with the system or a computer of the apparatus.

Accordingly, the program code itself, which is installed to the computer for implementing the functional processing of the present invention with the computer, implements the present invention. That is, the present invention also includes the computer program implementing the functional processing of the present invention. In this case, the program can be configured in any form, such as object code, a program executed by an interpreter, and script data supplied to an OS. Accordingly, the program can be configured in any form, such as object code, a program executed by an interpreter, and script data supplied to an OS. As the recording medium for supplying such program code, a floppy disk, a hard disk, an optical disk, a magneto-optical disk, an MO, a CD-ROM, a CD-R, a CD-RW, a magnetic tape, a nonvolatile memory card, a ROM, and a DVD (a DVD-read only memory (DVD-ROM) and a DVD-recordable (DVD-R)), for example, can be used.

The above program can also be supplied by connecting to a web site on the Internet by using a browser of a client computer and by downloading the program from the web site to a storage medium such as a hard disk.

In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing configure the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-214529 filed Aug. 7, 2006, which is hereby incorporated by reference herein in its entirety.

What is claimed is:

1. An image forming apparatus configured to perform printing when a reservation request including a count value for the printing is accepted by a management apparatus that performs charging management according to a print result, the image forming apparatus comprising:
 a first transmission unit configured to transmit, to the management apparatus, a reservation request including a first count value for printing a part of a print job before completing analysis on the entire print job;

a second transmission unit configured to transmit, to the management apparatus, a reservation request including a second count value for printing the entire print job after completing the analysis on the entire print job;

a switching unit configured to switch a print mode between a first mode for causing the first transmission unit to transmit the reservation request to the management apparatus and a second mode for causing the second transmission unit to transmit the reservation request to the management apparatus;

a printing unit configured to perform printing according to an acceptance of the reservation request by the management apparatus; and a request unit configured to request the management apparatus for a balance value usable for a user according to information about the user who has issued instructions for printing, wherein the switching unit switches the print mode from the first mode to the second mode when the balance value obtained through the request by the request unit is less than a predetermined count value, or continues the print mode in the first mode when the balance value is not less than the predetermined count value.

2. The image forming apparatus according to claim 1, wherein the first transmission unit transmits the reservation request concurrently with processing for analyzing the print job.

3. The image forming apparatus according to claim 1, wherein the first transmission unit transmits the reservation request concurrently with print processing performed by the printing unit.

4. The image forming apparatus according to claim 1, wherein the analysis is performed with a developing process for generating image data of each page on the basis of the print job.

5. A print processing method in an image forming apparatus configured to perform printing when a reservation request including a count value for the printing is accepted by a management apparatus that performs charging management according to a print result, the print processing method comprising:

a first transmission step of transmitting, to the management apparatus, a reservation request including a first count value for printing a part of a print job before completing analysis on the entire print job;

a second transmission step of transmitting, to the management apparatus, a reservation request including a second count value for printing the entire print job after completing the analysis on the entire print job by the image forming apparatus;

an instruction issuing step of issuing instructions for printing according to an acceptance of the reservation request by the management apparatus;

a switching step of switching a print mode between a first mode for causing the first transmission step to transmit the reservation request to the management apparatus and a second mode for causing the second transmission step to transmit the reservation request to the management apparatus; and a request step of requesting the management apparatus for a balance value usable for a user according to information about the user who has issued instructions for printing, wherein the switching step switches the print mode from the first mode to the second mode when the balance value obtained through the request by the request step is less than a predetermined count value, or continues the print mode in the first mode when the balance value is not less than the predetermined count value.

6. The print processing method according to claim 5, wherein the first transmission step transmits the reservation request concurrently with processing for analyzing the print job by the image forming apparatus.

7. The print processing method according to claim 5, wherein the first transmission step transmits the reservation request concurrently with print processing performed by the image forming apparatus.

8. The print processing method according to claim 5, wherein the analysis is performed with a developing process to generate image data of each page on the basis of the print job.

9. A non-transitory computer readable storage medium on which is stored a program for making a computer execute a print processing method for printing when a reservation request including a count value for the printing is accepted by a management apparatus that performs charging management according to a print result, the method comprising the steps of:

a first transmission step of transmitting, to the management apparatus, a reservation request including a first count value for printing a part of a print job before completing analysis on the entire print job;

a second transmission step of transmitting, to the management apparatus, a reservation request including a second count value for printing the entire print job after completing the analysis on the entire print job by the image forming apparatus;

an instruction issuing step of issuing instructions for printing according to an acceptance of the reservation request by the management apparatus;

a switching step of switching a print mode between a first mode for causing the first transmission step to transmit the reservation request to the management apparatus and a second mode for causing the second transmission step to transmit the reservation request to the management apparatus; and a request step of requesting the management apparatus for a balance value usable for a user according to information about the user who has issued instructions for printing, wherein the switching step switches the print mode from the first mode to the second mode when the balance value obtained through the request by the request step is less than a predetermined count value, or continues the print mode in the first mode when the balance value is not less than the predetermined count value.

10. A charging control system including a management apparatus configured to perform charging management according to a result of printing performed by an image forming apparatus and the image forming apparatus configured to perform printing when a reservation request including a count value for the printing is accepted by the management apparatus, the image forming apparatus comprising
a first transmission unit configured to transmit, to the management apparatus, a reservation request including a first count value for printing a part of a print job before completing analysis on the entire print job;
a second transmission unit configured to transmit, to the management apparatus, a reservation request including a second count value for printing the entire print job after completing the analysis on the entire print job;

a switching unit configured to switch a print mode between a first mode for causing the first transmission unit to transmit the reservation request to the management apparatus and a second mode for causing the second transmission unit to transmit the reservation request to the management apparatus;

a printing unit configured to perform printing according to an acceptance of the reservation request by the management apparatus;

a request unit configured to requesting the management apparatus for a balance value usable for a user according to information about the user who has issued instructions for printing; and a notification unit configured to send a print result notification including a count value according to a result of printing performed by the image forming apparatus, the management apparatus comprising a reservation accepting unit configured to accept the transmitted reservation request; and a charging unit configured to perform charging processing according to the print result notification sent from the notification unit, wherein the switching unit switches the print mode from the first mode to the second mode when the balance value obtained through the request by the request unit is less than a predetermined count value, or continues the print mode in the first mode when the balance value is not less than the predetermined count value.

11. A processing method in a charging control system including a management apparatus configured to perform charging management according to a result of printing performed by an image forming apparatus and the image forming apparatus configured to perform printing when a reservation request including a count value for the printing is accepted by the management apparatus, the processing method comprising:

a first transmission step of transmitting, to the management apparatus, a reservation request including a first count value for printing a part of a print job before completing analysis on the entire print job;

a second transmission step of transmitting, to the management apparatus, a reservation request including a second count value for printing the entire print job after completing the analysis on the entire print job;

a switching step of switching a print mode between a first mode for causing the first transmission step to transmit the reservation request to the management apparatus and a second mode for causing the second transmission step to transmit the reservation request to the management apparatus;

a printing step of performing printing according to an acceptance of the reservation request by the management apparatus;

a request step of requesting the management apparatus for a balance value usable for a user according to information about the user who has issued instructions for printing;

a notification step of sending a print result notification including a count value according to a result of printing performed by the image forming apparatus;

a reservation accepting step of accepting the transmitted reservation request; and a charging step of performing charging processing according to the print result notification sent in the notification step, wherein the switching step switches the print mode from the first mode to the second mode when the balance value obtained through the request in the request step is less than a predetermined count value, or continues the print mode in the first mode when the balance value is not less than the predetermined count value.

* * * * *